(12) United States Patent
Barman et al.

(10) Patent No.: US 9,360,883 B1
(45) Date of Patent: Jun. 7, 2016

(54) CLOCK MULTIPLEXER FOR GENERATING GLITCH-FREE CLOCK SIGNAL

(71) Applicant: FREESCALE SEMICONDUCTOR, INC., Austin, TX (US)

(72) Inventors: Arun Kumar Barman, Faridabad (IN); Vivek Sharma, New Delhi (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/835,738

(22) Filed: Aug. 26, 2015

(51) Int. Cl.
*H03K 17/00* (2006.01)
*G06F 1/08* (2006.01)

(52) U.S. Cl.
CPC ........................ *G06F 1/08* (2013.01)

(58) Field of Classification Search
CPC .................................................... H03K 17/005
See application file for complete search history.

(56) References Cited

U.S. PATENT DOCUMENTS

| | | | |
|---|---|---|---|
| 5,231,636 A | 7/1993 | Rasmussen | |
| 5,646,554 A | 7/1997 | Kim | |
| 6,239,626 B1 | 5/2001 | Chesavage | |
| 6,341,355 B1 | 1/2002 | Rutherford | |
| 6,501,304 B1 | 12/2002 | Boerstler et al. | |
| 6,563,349 B2 | 5/2003 | Menezes et al. | |
| 6,600,345 B1 | 7/2003 | Boutard | |
| 6,806,755 B1 | 10/2004 | Simmonds | |
| 6,975,145 B1 | 12/2005 | Vadi | |
| 7,046,047 B2 | 5/2006 | Daijo | |
| 7,375,571 B1 * | 5/2008 | Tiffany | G06F 1/04 327/298 |
| 7,427,881 B2 | 9/2008 | Starr | |
| 7,579,895 B2 | 8/2009 | Sun | |
| 7,629,828 B1 | 12/2009 | Nekl | |
| 7,679,048 B1 | 3/2010 | Aziz et al. | |
| 8,086,989 B2 | 12/2011 | Hailu | |
| 8,350,600 B2 | 1/2013 | Leon | |
| 8,570,069 B2 | 10/2013 | Zid et al. | |
| 8,860,468 B1 | 10/2014 | Khandelwal et al. | |
| 2008/0284484 A1 | 11/2008 | Lou | |
| 2008/0309393 A1 | 12/2008 | Sun et al. | |
| 2009/0016049 A1 | 1/2009 | Hedrick | |
| 2009/0016495 A1 | 1/2009 | Malas et al. | |
| 2009/0039940 A1 | 2/2009 | Hong | |
| 2010/0001767 A1 | 1/2010 | Shikata | |
| 2014/0118033 A1 | 5/2014 | Anker | |
| 2014/0320170 A1 | 10/2014 | Rooks | |

OTHER PUBLICATIONS

Mahmud, Rafey, "Techniques to make clock switching glitch free," EE Times Jun. 26, 2003 (http://www.eetimes.com/story/OEG20030626S0035).

* cited by examiner

*Primary Examiner* — Daniel Puentes
(74) *Attorney, Agent, or Firm* — Charles E. Bergere

(57) ABSTRACT

A fully digital glitch-free clock multiplexer includes a monitoring circuit that automatically switches to a newly selected clock, after a defined time period, from a currently selected clock, when the currently selected clock is absent. A maximum time limit is calculated based on a min and max clock frequency ratio. The monitoring circuit operates only when the clock is being switched. This provides flexibility to software to switch the clock any time whether or not the current clock is present, and prevents the system from hanging in the absence of the clock.

20 Claims, 17 Drawing Sheets

CLOCK MULTIPLEXER FOR GENERATING GLITCH-FREE CLOCK SIGNAL

BACKGROUND

The present invention relates generally to integrated circuits, and more particularly, to a clock multiplexer for generating a glitch-free clock signal.

Integrated circuits (ICs) such as a system on a chip (SoC) and application specific integrated circuits (ASICs) generally include two or more clock generators so that a malfunction or failure in one clock generator does not disable the system. Further, systems such as audio processors require inputs at different clock frequencies for tuning an audio frequency. Hence, such systems include several clock generators and a clock switching system. The clock generators provide clock signals at different frequencies and the clock switching system switches between the clock signals. The clock switching system includes a multiplexer to select and output one of the clock signals based on a select signal.

If a glitch occurs during a clock signal switching operation, data values within the IC may be corrupted. A known technique to avoid such glitches is to include a delay circuit in the clock switching system. During the switching operation, the delay circuit delays the clock output signal to prevent glitches from effecting the clock output signal. However, the delay prevents the clock switching system from switching from the currently selected clock signal to another clock signal before the currently selected clock signal goes inactive (i.e., when the currently selected clock signal is absent or is malfunctioning).

A known technique to overcome the above-mentioned problem is to include a monitoring circuit to detect the absence of the currently selected clock signal so that a controller or processor can change the select signal so that the multiplexer selects and outputs another clock signal. However, the addition of the monitoring circuit increases circuit area. Further, if the monitoring circuit malfunctions or fails, then there will be a failure in the clock switching system.

Another known technique includes resetting the clock generator when the currently selected clock signal is inactive. However, this technique is applicable only for a system that has two or more clock generators.

It would be advantageous to have a clock switching system that provides switching between multiple clock signals and avoids glitches.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
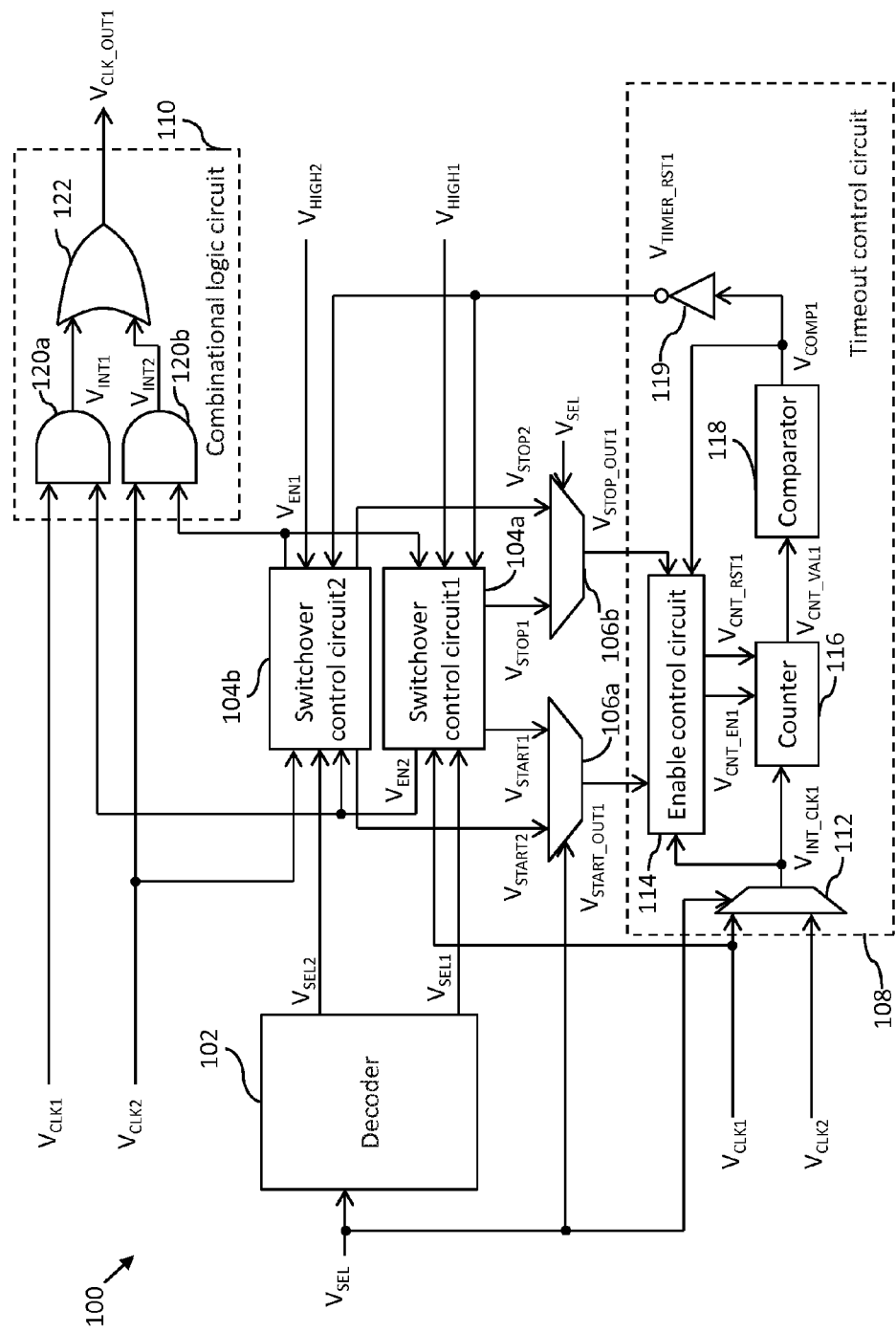
FIG. 1 is a schematic block diagram of a clock switching system that includes first and second switchover control circuits and a first timeout control circuit in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention. As used herein, the term multiplexer has been abbreviated as a mux.

In an embodiment of the present invention, a clock switching system is provided. The clock switching system comprises a decoder, first and second switchover control circuits, first and second muxes, a timeout control circuit, and a first combinational logic circuit. The decoder receives a select signal and generates first and second select signals. The first switchover control circuit receives a timer reset signal, a first clock signal, a second enable signal, and the first select signal, and generates a first enable signal, a first start timer signal, and a first stop timer signal. The second switchover control circuit receives the timer reset signal, a second clock signal, the second select signal, and the first enable signal, and generates the second enable signal, a second start timer signal, and a second stop timer signal. The first mux receives the first and second start timer signals and outputs a start timer output signal based on the select signal. The second mux receives the first and second stop timer signals and outputs a stop timer output signal based on the select signal. The timeout control circuit receives at least one of the first and second clock signals, the start timer signal, and the stop timer signal. The timeout control circuit performs a counting operation for generating a count value based on the start timer output signal, compares the count value with a predetermined timer value, generates the timer reset signal for resetting at least one of the first and second switchover control circuits when the count value is equal to the predetermined timer value, and terminates the counting operation based on at least one of the stop timer output signal and the timer reset signal. The first combinational logic circuit receives the first and second clock signals and the first and second enable signals and outputs at least one of the first and second clock signals as a clock output signal based on the first and second enable signals.

In another embodiment of the present invention, a clock switching system is provided. The clock switching system comprises a decoder, first, second, and third switchover control circuits, first and second muxes, a timeout control circuit, and a first combinational logic circuit. The decoder receives first and second bit signals and generates first, second, and third select signals. The first switchover control circuit receives a timer reset signal, a first clock signal, a second enable signal, and a third enable signal and generates a first enable signal, a first start timer signal, and a first stop timer signal. The second switchover control circuit receives the timer reset signal, a second clock signal, the second select signal, the first enable signal, and the third enable signal and generates the second enable signal, a second start timer signal, and a second stop timer signal. The third switchover control circuit receives the timer reset signal, a third clock signal, the third select signal, the first enable signal, and the second enable signal and generates the third enable signal, a third start timer signal, and a third stop timer signal. The first mux receives the first, second, and third start timer signals and the first and second bit signals, and outputs a start timer output signal based on the first and second bit signals. The second mux receives the first, second, and third stop timer signals and the first and second bit signals, and outputs a stop timer output signal based on the first and second bit signals. The timeout control circuit receives at least one of the first, second, and third clock signals, the start timer output signal, and the stop timer output signal. The timeout control circuit performs a counting operation for generating a count value based on the start timer signal, compares the count value with a predetermined timer value, generates the timer reset signal for resetting at least one of the first, second, and third switchover control circuits when the count value is equal to the predetermined timer value, and terminates the counting operation based on at least one of the stop timer signal and the timer reset signal. The first combinational logic circuit receives the first, second, and third clock signals and the first, second, and third enable signals, and outputs at least one of the first, second, and third clock signals as a clock output signal based on the third, first, and second enable signals.

Various embodiments of the present invention provide a clock switching system. The clock switching system receives multiple clock signals including first and second clock signals and switches from the first clock signal to the second clock signal. The clock switching system comprises multiple switchover control circuits, first and second muxes, a timeout control circuit, and a combinational logic circuit. The switchover control circuits generate corresponding enable signals, corresponding start timer signals, and corresponding stop timer signals. The first mux is connected to the switchover control circuits for receiving corresponding start timer signals and outputting a start timer output signal based on a select signal. The second mux is connected to the switchover control circuits for receiving corresponding stop timer signals and outputting a stop timer output signal based on the select signal. The timeout control circuit receives the clock signals, the start timer output signal and the stop timer output signal. The timeout control circuit performs a counting operation for generating a count value based on the start timer output signal, compares the count value with a predetermined timer value, generates a timer reset signal for resetting at least one switchover control circuit when the count value is equal to the predetermined timer value and terminates the counting operation based on at least one of the timer reset signal and the stop timer output signal. The combinational logic circuit receives the clock signals and the enable signals, and outputs the second clock signal.

The clock switching system does not require any dedicated circuit for monitoring a current state of a currently selected clock signal, thereby reducing the circuit area require for the clock mux. Further, the clock switching system provides switching from the first clock signal to the second clock signal even when the first clock signal is inactive, i.e., when the first clock signal is absent or malfunctioning.

Referring now to FIG. 1, a schematic block diagram of a first clock switching system 100 in accordance with an embodiment of the present invention is shown. The first clock switching system 100 includes a first decoder 102, first and second switchover control circuits 104a and 104b, first and second muxes 106a and 106b, a first timeout control circuit 108, and a first combinational logic circuit 110. The first timeout control circuit 108 includes a third mux 112, a first enable control circuit 114, a first counter 116, a first comparator 118, and a first NOT gate 119.

The first decoder 102 has an input terminal for receiving a select signal ($V_{SEL}$). The select signal may be generated by a processor or a controller. The first decoder 102 has first and second output terminals for generating first and second select signals ($V_{SEL1}$ and $V_{SEL2}$), respectively. In one embodiment, when the select signal is at low (i.e., logic low state), the first decoder 102 generates the first select signal at its first output terminal and when the select signal is high, the first decoder 102 generates the second select signal at its second output terminal.

The first switchover control circuit 104a is connected to the first output terminal of the first decoder 102 and receives the first select signal. The first switchover control circuit 104a further receives a first clock signal ($V_{CLK1}$), a tied high signal ($V_{HIGH1}$), a first timer reset signal ($V_{TIMER\_RST1}$), and a first enable signal ($V_{EN1}$). The first switchover control circuit 104a generates a first start timer signal ($V_{START1}$), a second enable signal ($V_{EN2}$), and a first stop timer signal ($V_{STOP1}$). The first switchover control circuit 104a will be explained in detail in conjunction with FIG. 2 below.

The second switchover control circuit 104b is connected to the second output terminal of the first decoder 102 and the first switchover control circuit 104a for receiving the second select signal and the second enable signal, respectively. The second switchover control circuit 104b further receives a second clock signal ($V_{CLK2}$), a second logic high signal ($V_{HIGH2}$), and the first timer reset signal. The second switchover control circuit 104b generates a second start timer signal ($V_{START2}$), the first enable signal, and a second stop timer signal ($V_{STOP2}$). In the presently preferred embodiment, the second switchover control circuit 104b has the same design as the first switchover control circuit 104a.

It will be understood by those of skill in the art that the first and second clock signals may be generated by oscillator circuits or other clock generator circuits.

The first mux 106a has first and second input terminals connected to the first and second switchover control circuits 104a and 104b for receiving the first and second start timer signals, respectively, and a select terminal for receiving the select signal. Based on the value of the select signal, the first mux 106a selects and outputs one of the first and second start timer signals as a first start timer output signal ($V_{START\_OUT1}$) at its output terminal. For example, when the select signal is low, the first mux 106a outputs the first start timer signal as the first start timer output signal, and when the select signal is high, the first mux 106a outputs the second start timer signal as the first start timer output signal.

The second mux 106b has first and second input terminals connected to the first and second switchover control circuits 104a and 104b for receiving the first and second stop timer signals, respectively, and a select terminal for receiving the select signal. Based on the value of the select signal, the second mux 106b selects and outputs one of the first and second stop timer signals as a first stop timer output signal ($V_{STOP\_OUT1}$) at its output terminal. For example, when the select signal is low, the second mux 106b outputs the first stop timer signal as the first stop timer output signal, and when the select signal is high, the second mux 106b outputs the second stop timer signal as the first stop timer output signal.

The third mux 112 has a first input terminal for receiving the first clock signal, a second input terminal for receiving the second clock signal, and a select terminal for receiving the select signal. Based on the value of the select signal, the third mux 112 selects and outputs one of the first and second clock signals as a first intermediate clock signal ($V_{INT\_CLK1}$) at its output terminal. For example, when the select signal is at low, the third mux 112 outputs the first clock signal as the first intermediate clock signal, and when the select signal is high the third mux 112 outputs the second clock signal as the first intermediate clock signal.

The first enable control circuit 114 is connected to the first, second, and third muxes 106a, 106b, and 112 for receiving the first start timer output signal, the first stop timer output signal, and the first intermediate clock signal. The first enable control circuit 114 further receives the first timer reset signal. The first enable control circuit 114 generates a first counter enable signal ($V_{CNT\_EN1}$) and a first counter reset signal ($V_{CNT\_RST1}$) based on at least one of the first start timer output signal, the first timer reset signal, and the first stop timer output signal.

The first counter 116 is connected to the third mux 112 for receiving the first intermediate clock signal. The first counter 116 also is connected to the first enable control circuit 114 for receiving the first counter enable signal and the first counter reset signal. The first counter 116 performs a counting operation based on the first counter enable signal and generates a first count value ($V_{CNT\_VAL1}$). The first counter 116 stops counting based on the first counter enable signal and the first counter reset signal. The first counter 116 is reset based on the first counter reset signal.

The first comparator 118 is connected to the first counter 116 for receiving the first count value. The first comparator 118 compares the first count value with a first predetermined timer value and generates a first comparison signal ($V_{COMP1}$) when the first count value is equal to the first predetermined timer value.

The first NOT gate 119 is connected to the first comparator 118 and receives the first comparison signal, and generates the first timer reset signal at its output terminal. The first timeout control circuit 108 activates the first timer reset signal to reset one of the first and second switchover control circuits 104a and 104b when the first count value is equal to the first predetermined timer value.

In one embodiment, the first predetermined timer value is calculated using expression (1):

$$V_{PRE\_TIMER1} = ((\text{frequency of a clock signal with a highest frequency})/(\text{frequency of a clock signal with a lowest frequency}))*(K_1)+1 \quad (1)$$

where, $V_{PRE\_TIMER1}$=the first predetermined timer value; and $K_1$=maximum number of clock cycles of the clock signal with the lowest frequency required for switching from the clock signal with the lowest frequency to the clock signal with the highest frequency=maximum number of clock cycles of the clock signal with the lowest frequency required for switching from the clock signal with the highest frequency to the clock signal with the lowest frequency=1.5.

In one embodiment, the clock signal with the lowest frequency is the second clock signal and the clock signal with the highest frequency is the first clock signal.

The first predetermined timer value is rounded to the next integer value when it is not an integer value. For example, if the frequency of the clock signal with the highest frequency is 500 MHz and the frequency of the clock signal with the lowest frequency is 35 MHz, then the $V_{PRE\_TIMER1}$=(((500/35)*(1.5))+1)=22.48, so the first predetermined timer value is rounded to 23.

The first timeout control circuit 108 receives the first start timer output signal and the first stop timer output signal. The first timeout control circuit 108 further receives the first and second clock signals. The first timeout control circuit 108 performs the counting operation to generate the first count value based on the first start timer output signal, compares the first count value with the first predetermined timer value, and generates the first timer reset signal to reset one of the first and second switchover control circuits 104a and 104b when the first count value is equal to the first predetermined timer value. The first timeout control circuit 108 terminates the counting operation based on at least one of the first stop timer output signal and the first comparison signal, i.e., an inverted first timer reset signal.

The first combinational logic circuit 110 is connected to the first and second switchover control circuits 104a and 104b for receiving the second enable signal and the first enable signal, respectively. The first combinational logic circuit 110 further receives the first and second clock signals and outputs at least one of the first and second clock signals as a first clock output signal ($V_{CLK\_OUT1}$) based on the second and first enable signals.

In one embodiment, the first combinational logic circuit 110 includes first and second logic gates 120a and 120b. The first and second logic gates 120a and 120b are AND gates or their functional equivalents. The first combinational logic circuit 110 further includes a third logic gate 122, which may be an OR gate or its logical equivalent. The first logic gate 120a has a first input terminal for receiving the first clock signal and a second input terminal connected to the first switchover control circuit 104a for receiving the second enable signal. The first logic gate 120a has an output terminal for generating a first intermediate signal ($V_{INT1}$). The second logic gate 120b has a first input terminal for receiving the second clock signal and a second input terminal connected to the second switchover control circuit 104b for receiving the first enable signal. The second logic gate 120b has an output terminal for generating a second intermediate signal ($V_{INT2}$). The third logic gate 122 has a first input terminal connected to the output terminal of the first logic gate 120a for receiving the first intermediate signal and a second input terminal connected to the output terminal of the second logic gate 120b for receiving the second intermediate signal. The third logic gate 122 has an output terminal for generating the first clock output signal.

Figure 2:
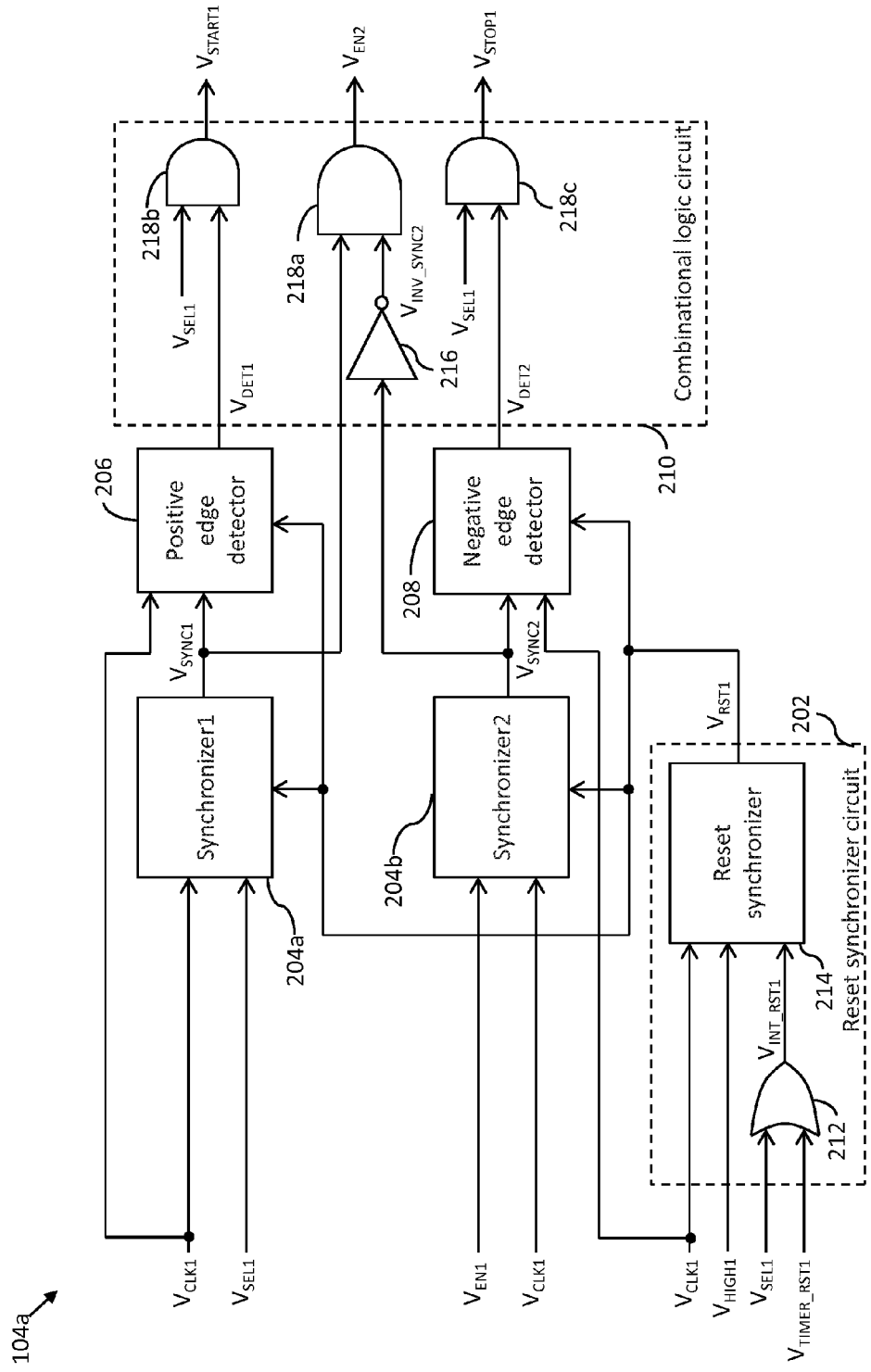
FIG. 2 is a schematic block diagram of the first switchover control circuit of FIG. 1 in accordance with an embodiment of the present invention.

Referring now to FIG. 2, a schematic block diagram of the first switchover control circuit 104a in accordance with an embodiment of the present invention is shown. The first switchover control circuit 104a includes a first reset synchronizer circuit 202, first and second synchronizers 204a and 204b, a first positive edge detector 206, a first negative edge detector 208, and a second combinational logic circuit 210.

The first reset synchronizer circuit 202 receives the first clock signal and the tied high signal and is connected to the first output terminal of the first decoder 102 and the output terminal of the first NOT gate 119 for receiving the first select signal and the first timer reset signal, respectively. The first reset synchronizer circuit 202 generates a first reset synchronizer signal ($V_{RST1}$). The first reset synchronizer circuit 202 includes a fourth logic gate 212 and a first reset synchronizer 214.

The fourth logic gate 212 has a first input terminal connected to the first output terminal of the first decoder 102 for receiving the first select signal and a second input terminal connected to the output terminal of the first NOT gate 119 for receiving the first timer reset signal. The fourth logic gate 212 has an output terminal for generating a first intermediate reset signal ($V_{INT\_RST1}$). In one embodiment, the fourth logic gate 212 is an OR gate or its functional equivalent.

The first reset synchronizer 214 receives the first clock signal and the tied high signal. The first reset synchronizer 214 is connected to the output terminal of the fourth logic gate 212 for receiving the first intermediate reset signal and generates the first reset synchronizer signal. The first reset synchronizer 214 will be explained in detail in conjunction with FIG. 3A.

The first synchronizer 204a receives the first clock signal and is connected to the first output terminal of the first decoder 102 and the first reset synchronizer 214 for receiving the first select signal and the first reset synchronizer signal, respectively. The first synchronizer 204a generates a first synchronizer signal ($V_{SYNC1}$). The first synchronizer 204a will be explained in detail in conjunction with FIG. 3B.

The second synchronizer 204b receives the first clock signal and is connected to the second switchover control circuit 104b and the first reset synchronizer 214 for receiving the first enable signal and the first reset synchronizer signal, respectively. The second synchronizer 204b generates a second synchronizer signal ($V_{SYNC2}$). The second synchronizer 204b is structurally and functionally similar to the first synchronizer 204a.

The first positive edge detector 206 receives the first clock signal and is connected to the first reset synchronizer 214 and the first synchronizer 204a for receiving the first reset synchronizer signal and the first synchronizer signal, respectively. The first positive edge detector 206 generates a first detector output signal ($V_{DET1}$). The first positive edge detector 206 will be explained in detail in conjunction with FIG. 4A.

The first negative edge detector 208 receives the first clock signal and is connected to the first reset synchronizer 214 and the second synchronizer 204b for receiving the first reset synchronizer signal and the second synchronizer signal, respectively. The first negative edge detector 208 generates a second detector output signal ($V_{DET2}$). The first negative edge detector 208 will be explained in detail in conjunction with FIG. 4B.

The second combinational logic circuit 210 is connected to the first and second synchronizers 204a and 204b for receiving the first and second synchronizer signals, respectively, connected to the first positive edge detector 206 and the first negative edge detector 208 for receiving the first and second detector output signals, respectively, and connected to the first output terminal of the first decoder 102 for receiving the first select signal. The second combinational logic circuit 210 generates the second enable signal based on the first and second synchronizer signals, generates the first start timer signal based on the first select signal and the first detector output signal, and generates the first stop timer signal based on the first select signal and the second detector output signal.

In one embodiment, the second combinational logic circuit 210 includes a fifth logic gate 216, which may be a NOT gate. The second combinational logic circuit 210 further includes sixth through eighth logic gates 218a-218c. The sixth through eighth logic gates 218a-218c are AND gates or functional equivalents. The fifth logic gate 216 has an input terminal connected to the second synchronizer 204b for receiving the second synchronizer signal. The fifth logic gate 216 generates an inverted version of the second synchronizer signal ($V_{INV\_SYNC2}$) (hereinafter referred to as an "inverted second synchronizer signal") at its output terminal. The sixth logic gate 218a has a first input terminal connected to the first synchronizer 204a for receiving the first synchronizer signal and a second input terminal connected to the output terminal of the fifth logic gate 216 for receiving the inverted second synchronizer signal. The sixth logic gate 218a has an output terminal that provides the second enable signal. The seventh logic gate 218b has a first input terminal connected to the first output terminal of the first decoder 102 for receiving the first select signal and a second input terminal connected to the first positive edge detector 206 for receiving the first detector output signal. The seventh logic gate 218b has an output terminal for provides the first start timer signal. The eighth logic gate 218c has a first input terminal connected to the first output terminal of the first decoder 102 for receiving the first select signal and a second input terminal connected to the first negative edge detector 208 for receiving the second detector output signal. The eighth logic gate 218c has an output terminal for providing the first stop timer signal.

As noted above, the second switchover control circuit 104b preferably has the same design as the first switchover control circuit 104a so a detailed description is not necessary for one of skill in the art to understand the invention.

Figure 3A:
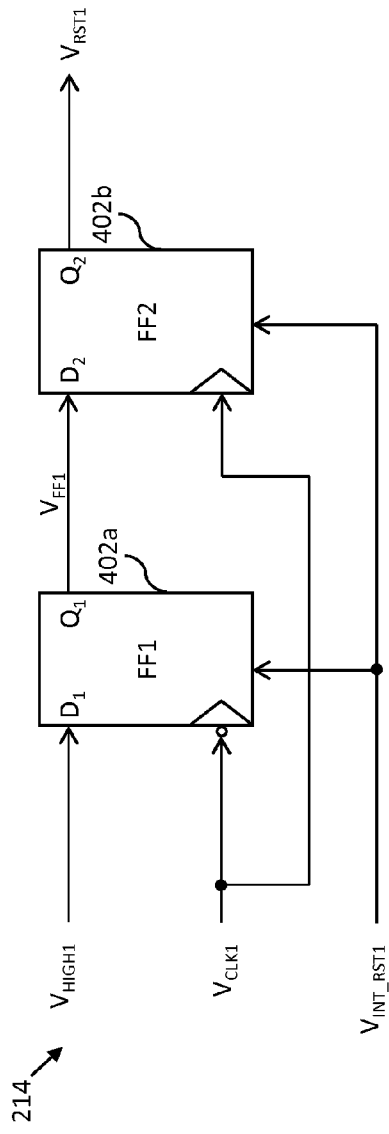
FIGS. 3A and 3B are schematic block diagrams of a reset synchronizer of the first switchover control circuit of FIG. 2 and a synchronizer of the first switchover control circuit of FIG. 2, respectively, in accordance with an embodiment of the present invention.

Referring now to FIG. 3A, a schematic block diagram of the first reset synchronizer 214 in accordance with an embodiment of the present invention is shown. The first reset synchronizer 214 includes first and second flip-flops 402a and 402b. The first flip-flop 402a has an input terminal for receiving the tied high signal, a clock terminal for receiving an inverted version of the first clock signal, a reset terminal connected to the output terminal of the fourth logic gate 212 for receiving the first intermediate reset signal, and an output terminal for generating a first flip-flop output signal ($V_{FF1}$). The second flip-flop 402b has an input terminal connected to the output terminal of the first flip-flop 402a for receiving the first flip-flop output signal, a clock terminal for receiving the first clock signal, a reset terminal connected to the output terminal of the fourth logic gate 212 for receiving the first intermediate reset signal, and an output terminal for generating the first reset synchronizer signal. It will be understood by those of skill in the art that the first reset synchronizer 214 can be implemented in several ways and will lie under the scope of the invention.

Figure 3B:
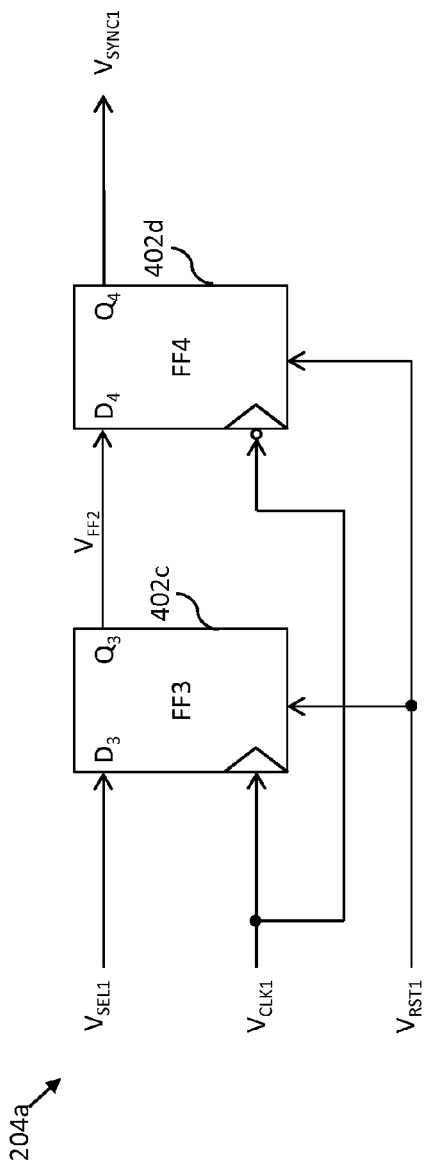

Referring now to FIG. 3B, a schematic block diagram of the first synchronizer 204a in accordance with an embodiment of the present invention is shown. The first synchronizer 204a includes third and fourth flip-flops 402c and 402d. The third flip-flop 402c has an input terminal connected to the first output terminal of the first decoder 102 for receiving the first select signal, a clock terminal for receiving the first clock signal, a reset terminal connected to the output terminal of the second flip-flop 402b for receiving the first reset synchronizer signal, and an output terminal for generating a second flip-flop output signal ($V_{FF2}$). The fourth flip-flop 402d has an input terminal connected to the output terminal of the third flip-flop 402c for receiving the second flip-flop output signal, a clock terminal for receiving an inverted version of the first clock signal, a reset terminal connected to the output terminal of the second flip-flop 402b for receiving the first reset synchronizer signal, and an output terminal for generating the first synchronizer signal. It will be understood by those of skill in the art that the first synchronizer 204a can be implemented in several ways and will lie under the scope of the invention.

Figure 4A:
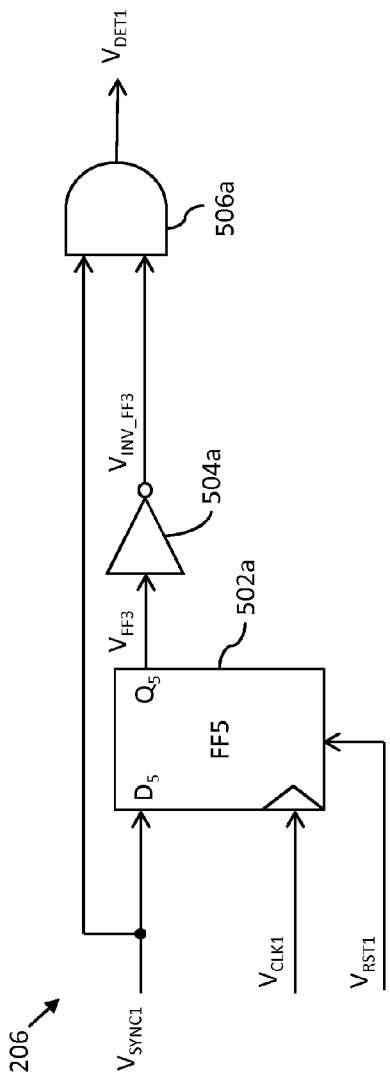
FIGS. 4A and 4B are schematic block diagrams of a positive edge detector of the first switchover control circuit of FIG. 2 and a negative edge detector of the first switchover control circuit of FIG. 2, respectively, in accordance with an embodiment of the present invention.

Referring now to FIG. 4A, a schematic block diagram of the first positive edge detector 206 in accordance with an embodiment of the present invention is shown. The first positive edge detector 206 includes a fifth flip-flop 502a, a fourteenth logic gate 504a, and a fifteenth logic gate 506a. The fifth flip-flop 502a has an input terminal connected to the first synchronizer 204a for receiving the first synchronizer signal, a clock terminal for receiving the first clock signal, a reset terminal connected to the output terminal of the second flip-flop 402b for receiving the first reset synchronizer signal, and an output terminal for generating a third flip-flop output signal ($V_{FF3}$). The fourteenth logic gate 504a has an input terminal connected to the output terminal of the fifth flip-flop 502a for receiving the third flip-flop output signal. The fourteenth logic gate 504a generates an inverted version of the third flip-flop output signal ($V_{INV\_FF3}$) (hereinafter referred to as an "inverted third flip-flop output signal") at its output terminal. In one embodiment, the fourteenth logic gate 504a is a NOT gate. The fifteenth logic gate 506a has a first input terminal connected to the output terminal of the fourth flip-flop 402d for receiving the first synchronizer signal and a second input terminal connected to the output terminal of the fourteenth logic gate 504a for receiving the inverted third flip-flop output signal. The fifteenth logic gate 506a has an output terminal for generating the first detector output signal. In one embodiment, the fifteenth logic gate 506a is an AND gate or its functional equivalent. It will be understood by those of skill in the art that the first positive edge detector 206 can be implemented in several ways and will lie under the scope of the invention.

Figure 4B:
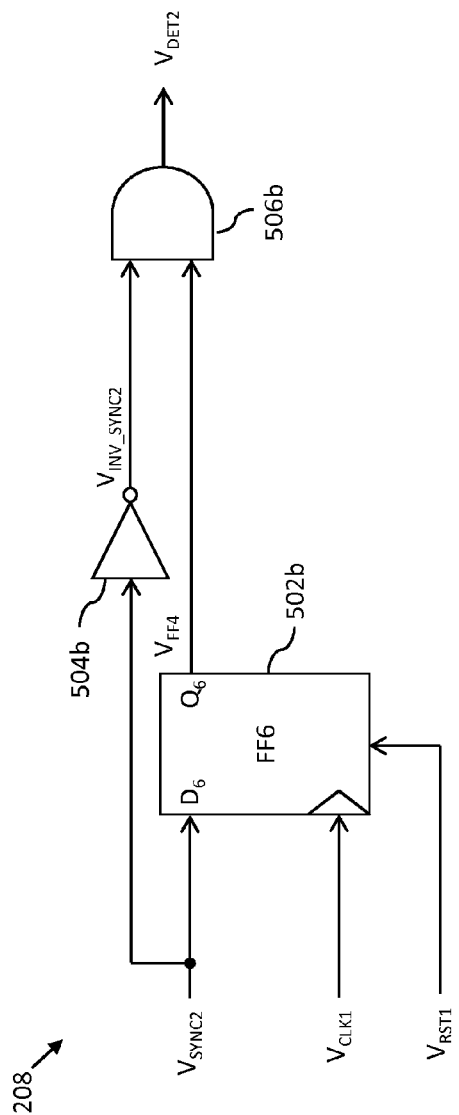

Referring now to FIG. 4B, a schematic block diagram of the first negative edge detector 208 in accordance with an embodiment of the present invention is shown. The first negative edge detector 208 includes a sixth flip-flop 502b, a sixteenth logic gate 504b, and a seventeenth logic gate 506b. The sixth flip-flop 502b has an input terminal connected to the second synchronizer 204b for receiving the second synchronizer signal, a clock terminal for receiving the first clock signal, a reset terminal connected to the output terminal of the second flip-flop 402b for receiving the first reset synchronizer signal, and an output terminal for generating a fourth flip-flop output signal ($V_{FF4}$). The seventeenth logic gate 506b has a first input terminal connected to the output terminal of the sixteenth logic gate 504b for receiving the inverted second synchronizer signal and a second input terminal connected to the output terminal of the sixth flip-flop 502b for receiving the fourth flip-flop output signal. The seventeenth logic gate 506b has an output terminal for generating the second detector output signal. In one embodiment, the seventeenth logic gate 506b is an AND gate. It will be understood by those of skill in the art that the first negative edge detector 208 can be implemented in several ways and will lie under the scope of the invention.

Figure 5:
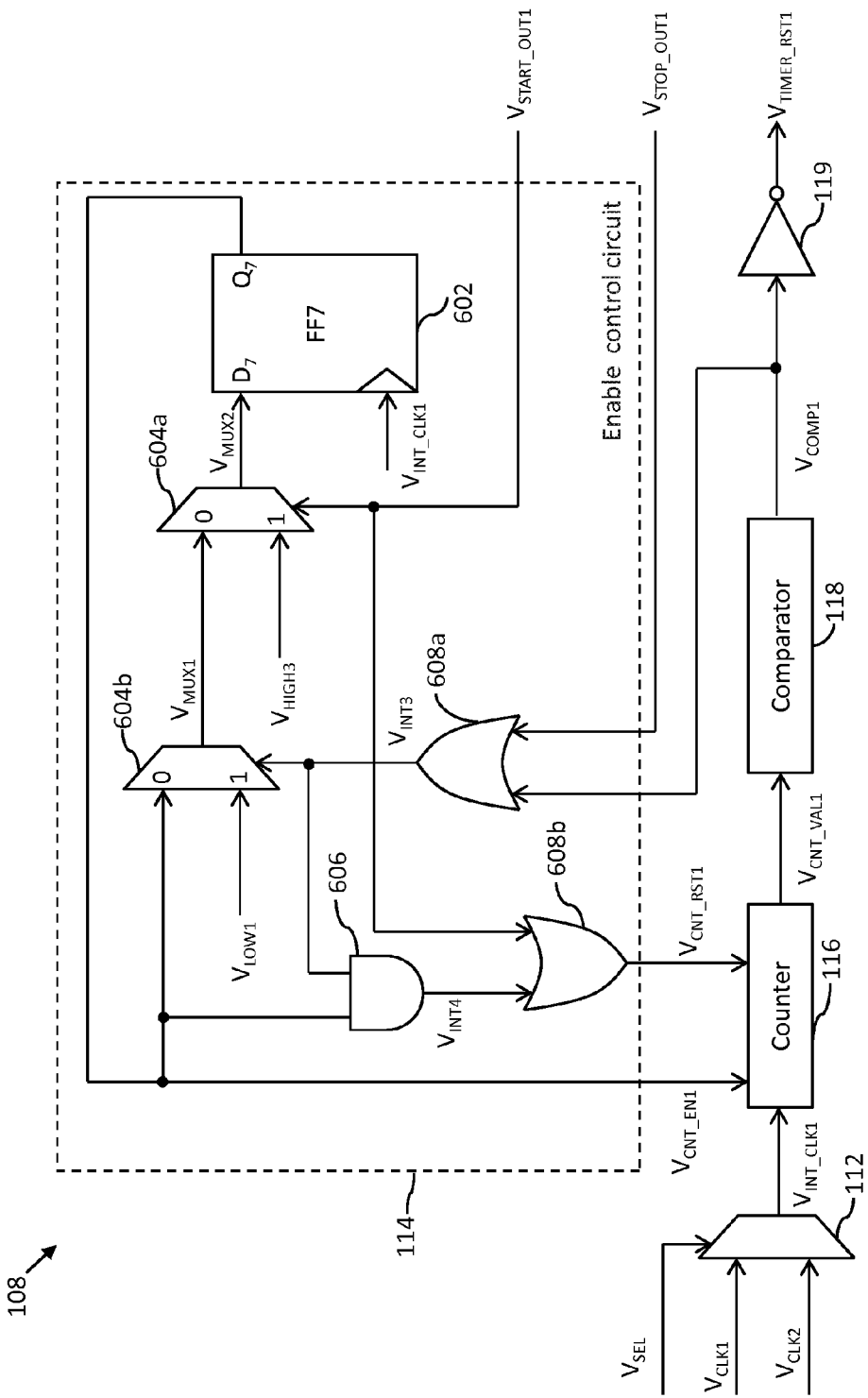
FIG. 5 is a schematic block diagram of the first timeout control circuit of FIG. 1 in accordance with an embodiment of the present invention.

Referring now to FIG. 5, a schematic block diagram of the first timeout control circuit 108 in accordance with an embodiment of the present invention is shown. The first timeout control circuit 108 includes the third mux 112, the first enable control circuit 114, the first counter 116, the first comparator 118, and the first NOT gate 119. The first enable control circuit 114 includes a seventh flip-flop 602, fourth and fifth muxes 604a and 604b, and an eighteenth logic gate 606. In one embodiment, the eighteenth logic gate 606 is an AND gate or its functional equivalent. The first enable control circuit 114 further includes nineteenth and twentieth logic gates 608a and 608b. In one embodiment, the nineteenth and twentieth logic gates 608a and 608b are OR gates or their functional equivalents.

The fourth mux 604a has a first input terminal for receiving a first mux output signal ($V_{MUX1}$), a second input terminal for receiving a third logic high signal ($V_{HIGH3}$), and a select terminal connected to the output terminal of the first mux 106a for receiving the first start timer output signal. Based on a value of the first start timer output signal, the fourth mux 604a outputs one of the first mux output signal and the third logic high signal as a second mux output signal ($V_{MUX2}$) at its output terminal. For example, when the first start timer output signal is low, the fourth mux 604a outputs the first mux output signal as the second mux output signal, and when the first start timer output signal is high, the fourth mux 604a outputs the third logic high signal as the second mux output signal.

The seventh flip-flop 602 has an input terminal connected to the output terminal of the fourth mux 604a for receiving the second mux output signal, a clock terminal connected to the output terminal of the third mux 112 for receiving the first intermediate clock signal, and an output terminal for generating the first counter enable signal.

The fifth mux 604b has a first input terminal connected to the output terminal of the seventh flip-flop 602 for receiving the first counter enable signal, a second input terminal for receiving a first logic low signal ($V_{LOW1}$), and a select terminal for receiving a third intermediate signal ($V_{INT3}$). Based on the third intermediate signal, the fifth mux 604b selects and outputs one of the first counter enable signal and the first logic low signal as the first mux output signal at its output terminal. For example, when the third intermediate signal is low, the fifth mux 604b outputs the first counter enable signal as the first mux output signal, and when the third intermediate signal is high, the fifth mux 604b outputs the first logic low signal as the first mux output signal.

The eighteenth logic gate 606 has a first input terminal for receiving the third intermediate signal and a second input terminal connected to the output terminal of the seventh flip-flop 602 for receiving the first counter enable signal. The eighteenth logic gate 606 has an output terminal for generating a fourth intermediate signal ($V_{INT4}$).

The nineteenth logic gate 608a has a first input terminal connected to the output terminal of the second mux 106b for receiving the first stop timer output signal and a second input terminal connected to the first comparator 118 for receiving the first comparison signal. The nineteenth logic gate 608a has an output terminal for generating the third intermediate signal.

The twentieth logic gate 608b has a first input terminal connected to the output terminal of the eighteenth logic gate 606 for receiving the fourth intermediate signal and a second input terminal connected to the output terminal of the first mux 106a for receiving the first start timer output signal. The twentieth logic gate 608b has an output terminal for generating the first counter reset signal.

Figure 6A:
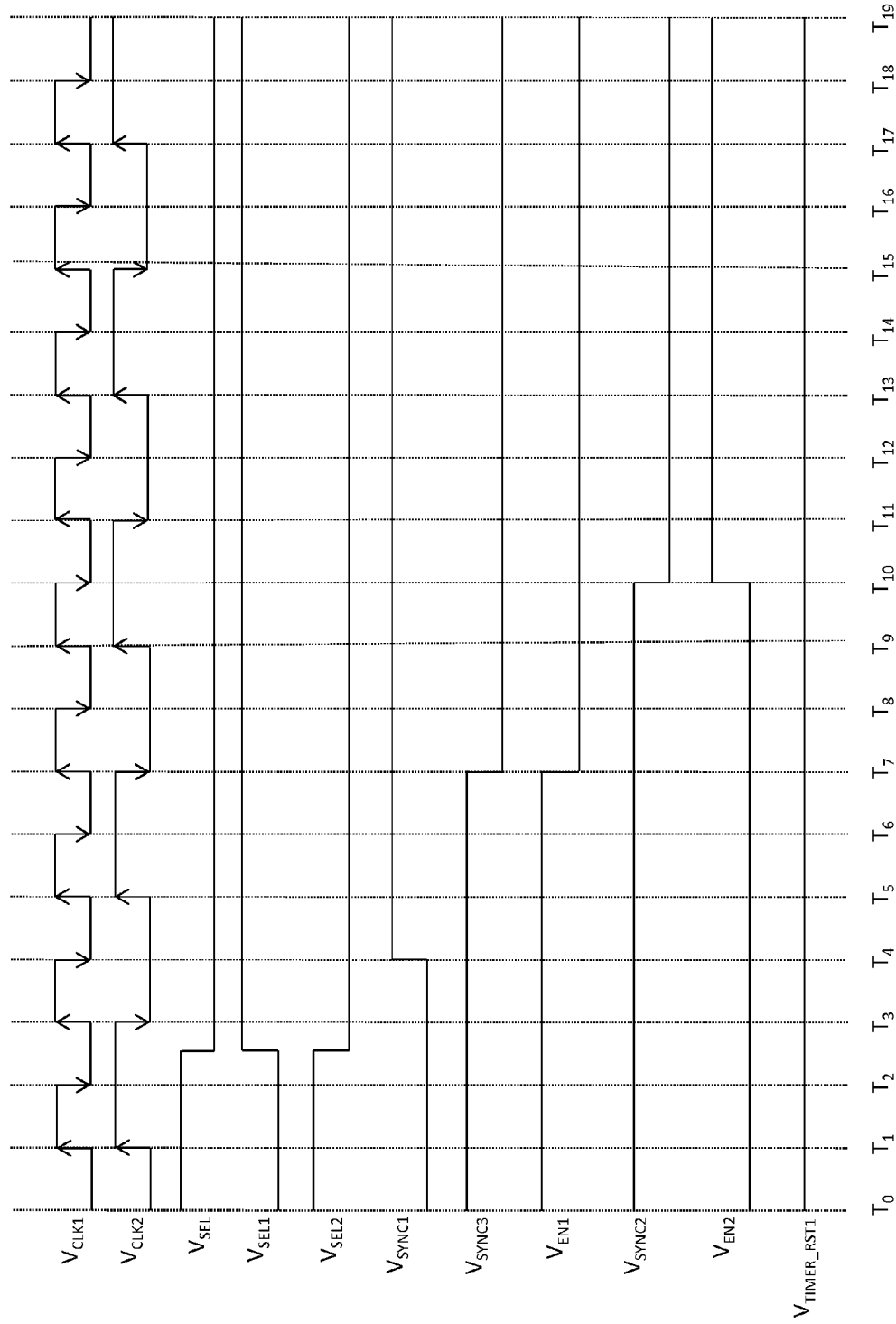
FIGS. 6A and 6B are a timing diagram illustrating a switching operation of the clock switching system of FIG. 1 when a currently selected clock signal is active in accordance with an embodiment of the present invention.
Figure 6B:
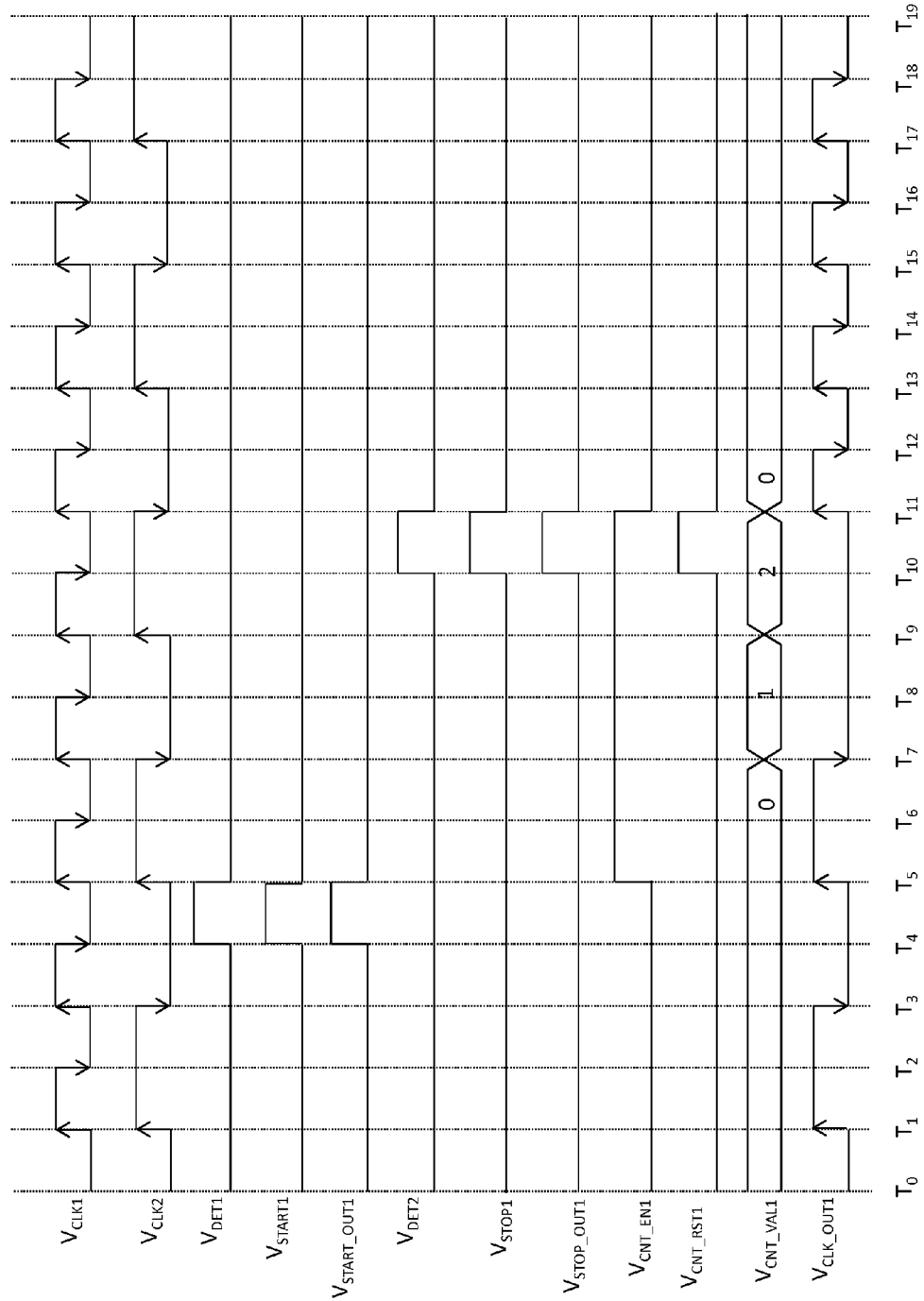

Referring now to FIGS. 6A and 6B, a timing diagram illustrating a switching operation of the first clock switching system 100 when a currently selected clock signal is active in accordance with an embodiment of the present invention is shown. In an example, a frequency of the first clock signal is 40 megahertz (MHz), a frequency of the second clock signal is 20 MHz, and the first predetermined timer value is 4.

From time $T_0$-$T_2$, the select signal is high and hence, the second select signal is high and the first select signal is low. The first enable signal is high and the second enable signal is low. Thus, the third logic gate 122 outputs the second clock signal as the first clock output signal since the currently selected clock signal is the second clock signal.

From time $T_2$-$T_4$, the select signal transitions from high to low. The first decoder 102 generates a high first select signal and low second select signal. Thus, the first synchronizer 204a receives the high first select signal and the third synchronizer 304a receives the low second select signal.

From time $T_4$-$T_5$, the first synchronizer 204a generates a high first synchronizer signal. The first positive edge detector 206 generates a high first detector output signal. The seventh logic gate 218b receives the high first select signal and the high first detector output signal. Thus, the seventh logic gate 218b generates a high first start timer signal. Since the first mux 106a receives a low select signal, the first mux 106a outputs the first start timer output signal, which is high.

From time $T_5$-$T_7$, the first positive edge detector 206 generates the first detector output signal at logic low state. The seventh logic gate 218b generates the first start timer signal at logic low state. Thus, the first mux 106a outputs the first start timer output signal at logic low state. The first enable control circuit 114 generates the first counter enable signal at logic high state.

From time period $T_7$-$T_{10}$, the first counter 116 receives the first counter enable signal at logic high state and performs the counting operation. The third synchronizer 304a generates the third synchronizer signal at logic low state. The eleventh logic gate 318a receives the third synchronizer signal at logic low state and generates the first enable signal at logic low state. Since the first count value is less than the first predetermined timer value, the first comparator 118 generates the first comparison signal at logic low state. Thus, the first NOT gate 119 generates the first timer reset signal at logic high state. Since the first enable signal is at logic low state, the third logic gate 122 does not output the second clock signal as the first clock output signal.

From time $T_{10}$-$T_{11}$, the second synchronizer 204b generates the second synchronizer signal at logic low state. The fifth logic gate 216 receives the second synchronizer signal at logic low state and generates the inverted second synchronizer signal at logic high state. The sixth logic gate 218a receives a high first synchronizer signal and a high inverted second synchronizer signal, so generates a high second enable signal. The first negative edge detector 208 generates a high second detector output signal. The eighth logic gate 218c receives the first select signal at logic high state and the high second detector output signal, so generates a high first stop timer signal. Since the select signal is low, the second mux 106b outputs the first stop timer output signal at logic high state. The first enable control circuit 114 generates the first counter reset signal at logic high state. The third logic gate 122 outputs the first clock signal as the first clock output signal.

From time $T_{11}$-$T_{19}$, the first negative edge detector 208 generates the second detector output signal at logic low state. Thus, the eighth logic gate 218c receives the second detector output signal at logic low state and generates the first stop timer signal at logic low state. The second mux 106b outputs the first stop timer output signal at logic low state. The first enable control circuit 114 receives the first stop timer output signal at logic low state and generates the first counter enable signal at logic low state. The first enable control circuit 114 generates the first counter reset signal at logic low state. The first counter 116 terminates the counting operation and resets. Thus, the first comparator 118 generates the first comparison signal at logic low state. The first NOT gate 119 generates the first timer reset signal at logic high state. Since the second enable signal is high, the third logic gate 122 continues to output the first clock output signal.

Since the first enable signal transitions from high to low at time $T_7$ and the second enable signal transitions from low to high at time $T_{10}$, the first and second enable signals are non-overlapping. Hence, the third logic gate 122 does not output either of the second and first clock signals as the first clock output signal during time $T_7$ to $T_{10}$, so a glitch-free switching between the second and first clock signals is provided. Further, as the second clock signal is active during the switching operation, the first timeout control circuit 108 does not enable the first timer reset signal during the switching operation and hence, generates the first timer reset signal at logic high state.

Figure 7A:
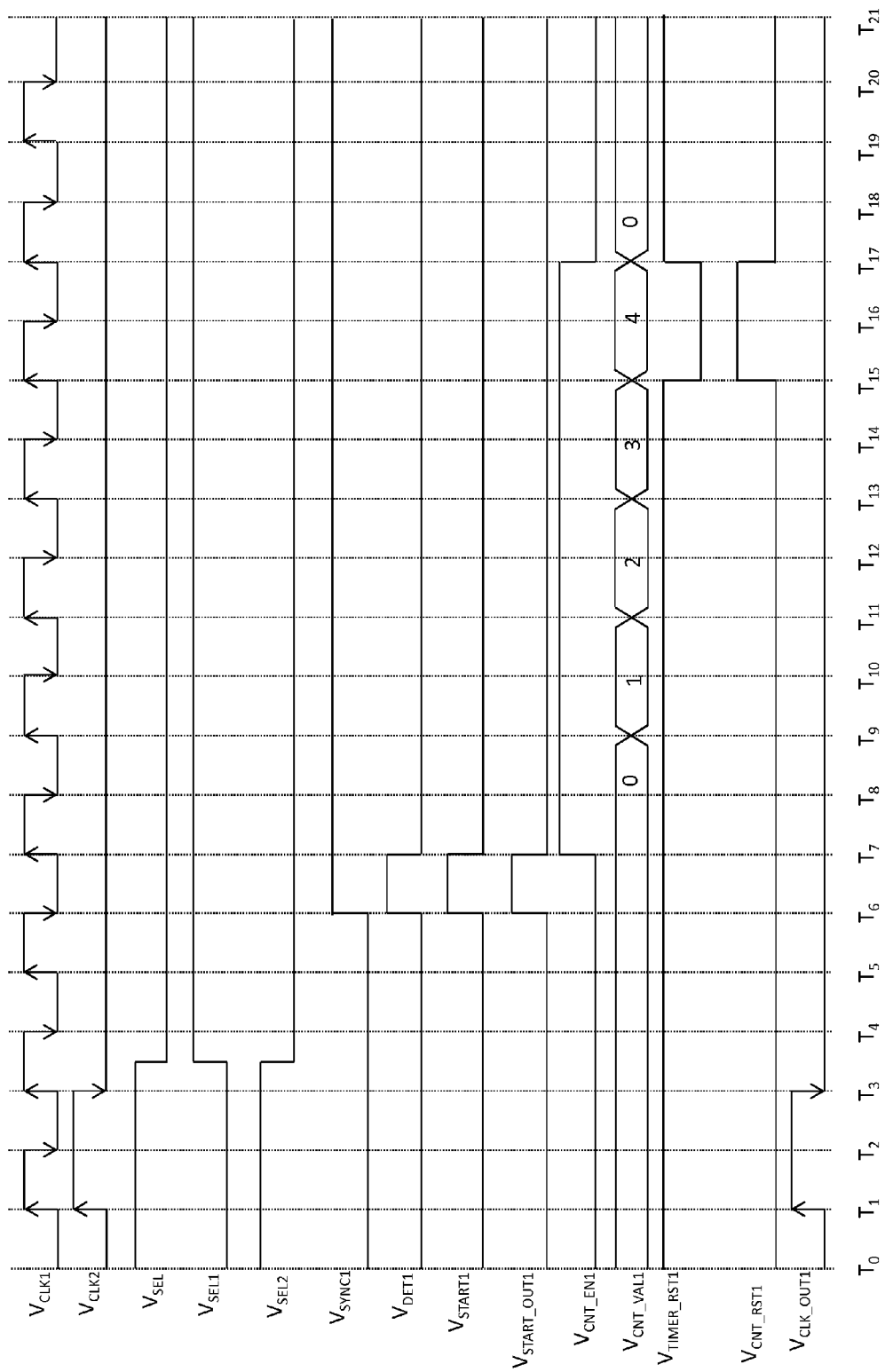
FIGS. 7A and 7B are a timing diagram illustrating a switching operation of the clock switching system of FIG. 1 when a currently selected clock signal is inactive in accordance with an embodiment of the present invention.
Figure 7B:
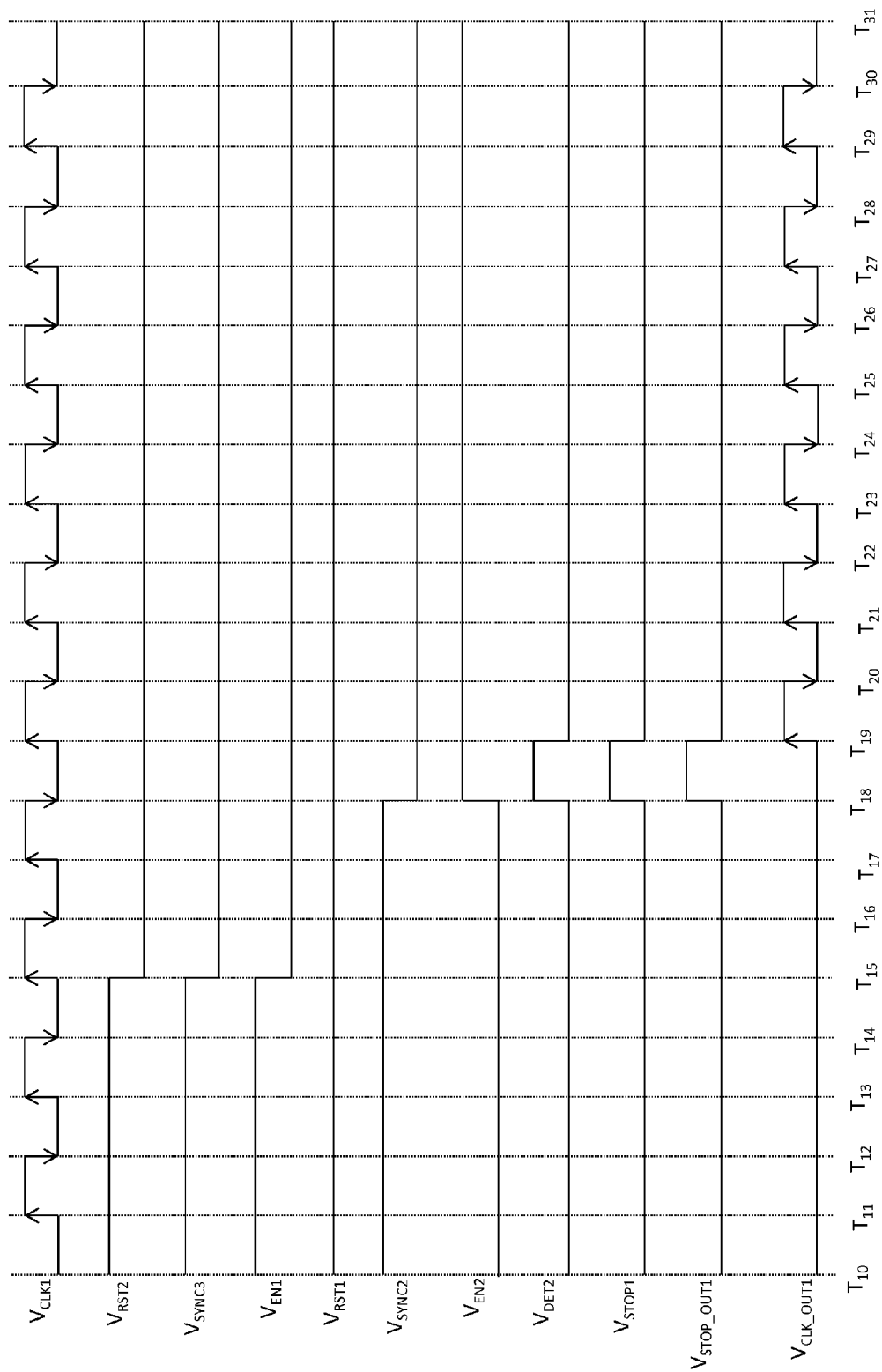

Referring now to FIGS. 7A and 7B, a timing diagram illustrating a switching operation of the first clock switching system 100 when a currently selected clock signal is inactive in accordance with an embodiment of the present invention is shown.

From time $T_0$-$T_3$, the select signal is high, hence the second select signal is high and the first select signal is low. The first enable signal is high and the second enable signal is low. The third logic gate 122 outputs the second clock signal as the first clock output signal. Thus, the currently selected clock signal is the second clock signal.

After time $T_3$, the second clock signal is inactive. From time $T_3$-$T_6$, the select signal transitions from high to low. The first decoder 102 generates the first select signal at logic high state and the second select signal at logic low state. Thus, the first synchronizer 204a receives the first select signal at logic high state and the third synchronizer 304a receives the second select signal at logic low state.

From time $T_6$-$T_7$, the first synchronizer 204a generates the first synchronizer signal at logic high state. The first positive edge detector 206 generates the first detector output signal at logic high state. The seventh logic gate 218b receives the first select signal at logic high state and the first detector output signal at logic high state and generates the first start timer signal at logic high state. Thus, the first mux 106a outputs the first start timer output signal at logic high state.

From time $T_7$-$T_9$, the first enable control circuit 114 generates the first counter enable signal at logic high state.

From time $T_9$-$T_{15}$, the first counter 116 receives the first counter enable signal at logic high state and performs the counting operation. The first counter 116 generates the first count value. Since the first count value is less than the first predetermined timer value, the first comparator 118 generates the first comparison signal at logic low state.

From time $T_{15}$-$T_{17}$, the first count value is 4. Since the first count value is equal to the first predetermined timer value, the first comparator 118 generates the first comparison signal at logic high state. Thus, the first NOT gate 119 generates the first timer reset signal at logic low state. The first enable control circuit 114 generates the first counter reset signal at logic high state.

The ninth logic gate 312 receives the second select signal at logic low state and the first timer reset signal at logic low state, so generates the second intermediate reset signal at logic low state. The second reset synchronizer 314 receives the second intermediate reset signal at logic low state and generates the second reset synchronizer signal at logic low state, which resets the third and fourth synchronizers 304a and 304b and the second positive and negative edge detectors 306 and 308. Thus, the third synchronizer 304a generates the third synchronizer signal at logic low state. The eleventh logic gate 318a receives the third synchronizer signal at logic low state and generates the first enable signal at logic low state. Thus, the second switchover control circuit 104b is reset.

The fourth logic gate 212 receives the first select signal at logic high state and the first timer reset signal at logic low state, so it generates the first intermediate reset signal at logic high state. The first reset synchronizer 214 receives the first intermediate reset signal at logic high state and hence generates the first reset synchronizer signal at logic high state. Thus, the first switchover control circuit 104a does not reset.

From time $T_{17}$-$T_{18}$, the first enable control circuit 114 generates the first counter enable signal at logic low state. The first enable control circuit 114 generates the first counter reset signal at logic low state. The first counter 116 stops the counting operation and is reset.

From time $T_{18}$-$T_{19}$, the second synchronizer 204b generates the second synchronizer signal at logic low state. The fifth logic gate 216 receives the second synchronizer signal at logic low state and generates the inverted second synchronizer signal at logic high state. The sixth logic gate 218a receives the first synchronizer signal at logic high state and the inverted second synchronizer signal at logic high state and so it generates the second enable signal at logic high state. The first negative edge detector 208 generates the second detector output signal at logic high state and the eighth logic gate 218c generates the first stop timer signal at logic high state. Thus, the second mux 106b outputs the first stop timer output signal at logic high state. The third logic gate 122 generates the first clock signal as the first clock output signal since the second enable signal is at logic high state.

From time $T_{19}$-$T_{31}$, the first negative edge detector 208 generates the second detector output signal at logic low state and the eighth logic gate 218c generates the first stop timer signal at logic low state. Thus, the second mux 106b outputs the first stop timer output signal at logic low state. The third logic gate 122 continues to output the first clock signal as the first clock output signal.

Since the first enable signal transitions from high to low at time $T_{15}$ and the second enable signal transitions from low to high at time $T_{18}$, the first and second enable signals are non-overlapping. Hence, the third logic gate 122 does not output either of the second and first clock signals as the first clock output signal during time period $T_{15}$ to $T_{18}$, so glitch-free switching between the second and first clock signals is provided.

The first clock switching system 100 switches from the second clock signal to the first clock signal even when the second clock signal is inactive. Further, as the second clock signal is inactive during the switching operation, the first timeout control circuit 108 enables the first timer reset signal during the switching operation and hence generates the first timer reset signal at logic low state for resetting the second switchover control circuit 104b.

It will be apparent to those of skill in the art that when the first clock switching system 100 provides switching from a first clock signal to a second clock signal and the first clock signal is inactive, all switchover control circuits except the switchover control circuit performing functions using the second clock signal are reset.

Thus, the first clock switching system 100 can be used for providing the second clock output signal at various clock frequencies, i.e., the first clock switching system 100 can provide switching between multiple clock signals.

Figure 8:
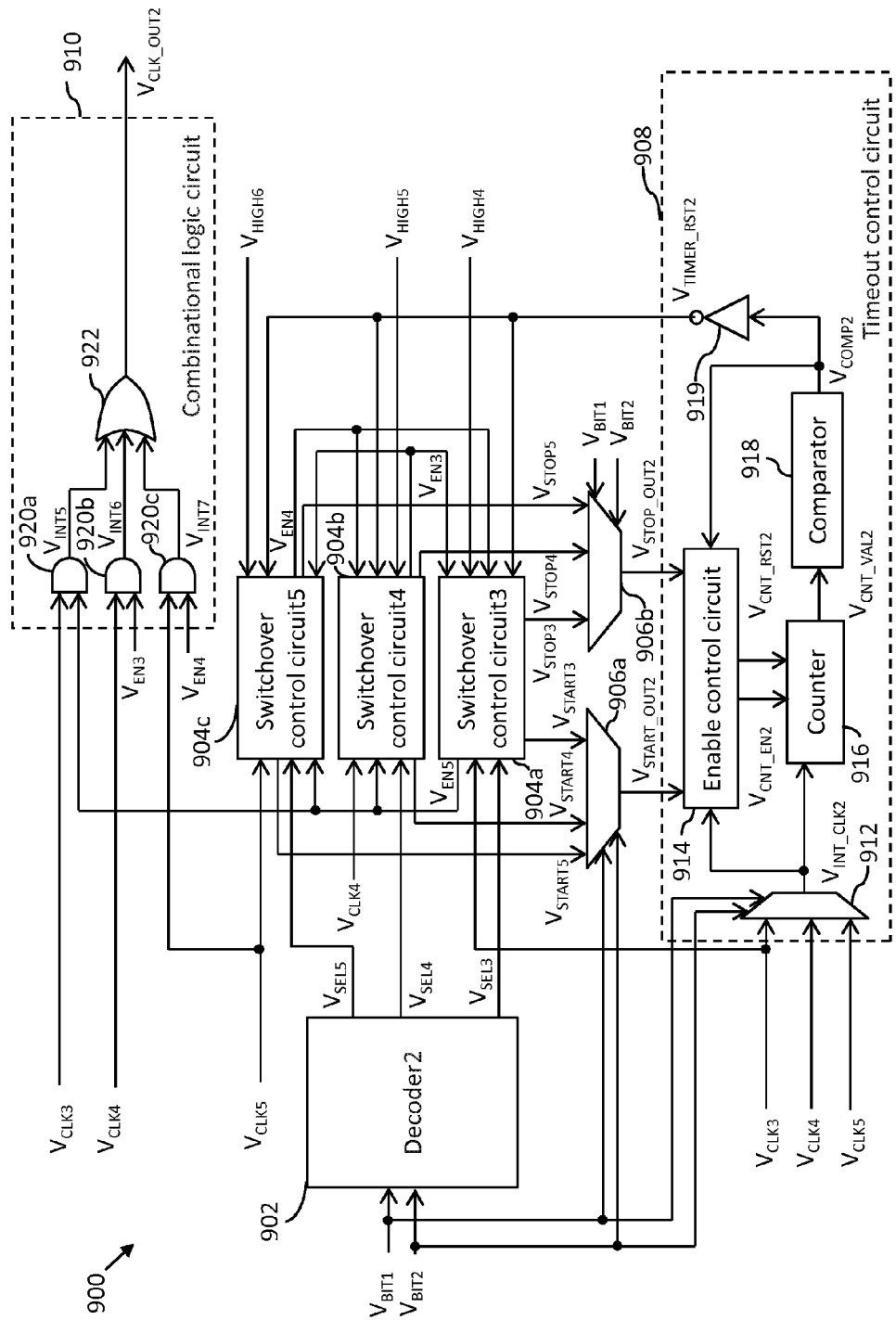
FIG. 8 is a schematic block diagram of another clock switching system that includes third, fourth, and fifth switchover control circuits and a second timeout control circuit in accordance with another embodiment of the present invention.

Referring to FIG. 8, a schematic block diagram of a second clock switching system 900 in accordance with another embodiment of the present invention is shown. The second clock switching system 900 includes a second decoder 902, third through fifth switchover control circuits 904a-904c, sixth and seventh muxes 906a and 906b, a second timeout control circuit 908, and a fourth combinational logic circuit 910. The second timeout control circuit 908 includes an eighth mux 912, a second enable control circuit 914, a second counter 916, a second comparator 918, and a second NOT gate 919.

The second decoder 902 has first and second input terminals for receiving first and second bit signals ($V_{BIT1}$ and $V_{BIT2}$, respectively. The first and second bit signals may be generated by a processor or controller circuit. The first bit signal represents a most significant bit (MSB) signal and the second bit signal represents a least significant bit (LSB) signal. The second decoder 902 has first, second, and third output terminals for generating third, fourth, and fifth select signals ($V_{SEL3}$, $V_{SEL4}$, and $V_{SEL5}$), respectively. Based on the value of the first and second bit signals, the second decoder 902 generates the third select signal, the fourth select signal, and the fifth select signal. When the first and second bit signals are low (i.e., "00"), the second decoder 902 generates the third select signal at its first output terminal. When the first bit signal is low and the second bit signal is high (i.e., "01"), the second decoder 902 generates the fourth select signal at its second output terminal. When the first bit signal is high and the second bit signal is low (i.e., "10"), the second decoder 902 generates the fifth select signal at its third output terminal.

The third switchover control circuit 904a is connected to the first output terminal of the second decoder 902 for receiving the third select signal. The third switchover control circuit 904a further receives a third clock signal ($V_{CLK3}$), a fourth logic high signal ($V_{HIGH4}$), a second timer reset signal ($V_{TIMER\_RST2}$), and third and fourth enable signals ($V_{EN3}$ and $V_{EN4}$). The third switchover control circuit 904a generates a third start timer signal ($V_{START3}$), a fifth enable signal ($V_{EN5}$), and a third stop timer signal ($V_{STOP3}$). The third switchover control circuit 904a is described in detail in conjunction with FIG. 9.

The fourth switchover control circuit 904b is connected to the second output terminal of the second decoder 902 and the third switchover control circuit 904a for receiving the fourth select signal and the fifth enable signal, respectively. The fourth switchover control circuit 904b further receives a fourth clock signal ($V_{CLK4}$), the fourth enable signal, a fifth logic high signal ($V_{HIGH5}$), and the second timer reset signal. The fourth switchover control circuit 904b generates a fourth start timer signal ($V_{START4}$), the third enable signal, and a fourth stop timer signal ($V_{STOP4}$). The fourth switchover control circuit 904b preferably has the same circuit design as the third switchover control circuit 904a shown in FIG. 9.

The fifth switchover control circuit 904c receives a fifth clock signal ($V_{CLK5}$), a sixth logic high signal ($V_{HIGH6}$), and the second timer reset signal. The fifth switchover control circuit 904c is connected to the third output terminal of the second decoder 902 for receiving the fifth select signal. The fifth switchover control circuit 904c is further connected to the third and fourth switchover control circuits 904a and 904b for receiving the fifth enable signal and the third enable signal, respectively. The fifth switchover control circuit 904c generates a fifth start timer signal ($V_{START5}$) r the fourth enable signal, and a fifth stop timer signal ($V_{STOP5}$). The fifth switchover control circuit 904c preferably has the same circuit design as the third switchover control circuit 904a shown in FIG. 9.

It will be understood by those of skill in the art that the third, fourth, and fifth clock signals may be generated by oscillator circuits or other clock generator circuits.

The sixth mux 906a has first, second, and third input terminals connected to the third, fourth, and fifth switchover control circuits 904a, 904b, and 904c for receiving the third, fourth, and fifth start timer signals, respectively, and first and second select terminals for receiving the first and second bit signals, respectively. Based on the first and second bit signals, the sixth mux 906a selects and outputs at least one of the third, fourth, and fifth start timer signals as a second start timer output signal ($V_{START\_OUT2}$) at an output terminal thereof. When the first and second bit signals are both low, the sixth mux 906a selects and outputs the third start timer signal as the second start timer output signal. When the first bit signal is low and the second bit signal is high, the sixth mux 906a selects and outputs the fourth start timer signal as the second start timer output signal. When the first bit signal is high and the second bit signal is low, the sixth mux 906a selects and outputs the fifth start timer signal as the second start timer output signal.

The seventh mux 906b has first, second, and third input terminals connected to the third, fourth, and fifth switchover control circuits 904a, 904b, and 904c for receiving the third, fourth, and fifth stop timer signals, respectively, and first and second select terminals for receiving the first and second bit signals, respectively. Based on the first and second bit signals, the seventh mux 906b selects and outputs one of the third, fourth, and fifth stop timer signals as a second stop timer output signal ($V_{STOP\_OUT2}$) at its output terminal. When the first and second bit signals are both low, the seventh mux 906b selects and outputs the third stop timer signal as the second stop timer output signal. When the first bit signal is low and the second bit signal is high, the seventh mux 906b selects and outputs the fourth stop timer signal as the second stop timer output signal. When the first bit signal is at high and the second bit low state, the seventh mux 906b selects and outputs the fifth stop timer signal as the second stop timer output signal.

The eighth mux 912 has a first input terminal for receiving the third clock signal, a second input terminal for receiving the fourth clock signal, a third input terminal for receiving the fifth clock signal, and first and second select terminals for receiving the first and second bit signals, respectively. Based on the first and second bit signals, the eighth mux 912 selects and outputs one of the third, fourth, and fifth clock signals as a second intermediate clock signal ($V_{INT\_CLK2}$) at its output terminal. When the first and second bit signals are both low, the eighth mux 912 selects and outputs the third clock signal as the second intermediate clock signal. When the first bit signal is low and the second bit signal is high, the eighth mux 912 selects and outputs the fourth clock signal as the second intermediate clock signal. When the first bit signal is high and the second bit signal is low, the eighth mux 912 selects and outputs the fifth clock signal as the second intermediate clock signal.

The second enable control circuit 914 is connected to the sixth, seventh, and eighth muxes 906a, 906b, and 912 for receiving the second start timer output signal, the second stop timer output signal, and the second intermediate clock signal, respectively. The second enable control circuit 914 further receives the second timer reset signal. The second enable control circuit 914 generates a second counter enable signal ($V_{CNT\_EN2}$) and a second counter reset signal ($V_{CNT\_RST2}$) based on at least one of the second start timer output signal, the second timer reset signal, and the second stop timer output signal.

The second counter 916 is connected to the output terminal of the eighth mux 912 for receiving the second intermediate clock signal. The second counter 916 is connected to the second enable control circuit 914 for receiving the second counter enable signal and the second counter reset signal. The second counter 916 performs a counting operation based on the second counter enable signal for generating a second count value ($V_{CNT\_VAL2}$) and terminates the counting operation based on at least one of the second counter enable signal and the second counter reset signal. The second counter 916 is reset based on the second counter reset signal.

The second comparator 918 is connected to the second counter 916 for receiving the second count value. The second comparator 918 compares the second count value with a second predetermined timer value and generates a second comparison signal ($V_{COMP2}$) at logic high state when the second count value is equal to the second predetermined timer value.

The second NOT gate 919 is connected to the second comparator 918 and receives the second comparison signal and generates the second timer reset signal. The second timeout control circuit 908 enables the second timer reset signal for resetting at least one of the third, fourth, and fifth switchover control circuits 904a, 904b, and 904c when the second count value is equal to the second predetermined timer value. In one embodiment, the second comparator 918 generates a high active second comparison signal that enables the second timer reset signal.

In one embodiment, the second predetermined timer value is calculated using expression (2) given below:

$$V_{PRE\_TIMER2}=(((\text{frequency of a clock signal with a highest frequency})/(\text{frequency of a clock signal with a lowest frequency}))*(K_2))+1 \quad (2)$$

where, $V_{PRE\_TIMER2}$=the second predetermined timer value; and $K_2$=maximum number of clock cycles of the clock signal with the lowest frequency required for switching from the clock signal with the lowest frequency to the clock signal with the highest frequency=maximum number of clock cycles of the clock signal with the lowest frequency required for switching from the clock signal with the highest frequency to the clock signal with the lowest frequency=1.5.

In this embodiment, the clock signal with the lowest frequency is the fifth clock signal and the clock signal with the highest frequency is the third clock signal.

The second predetermined timer value is rounded to the next integer value when the second predetermined timer value is not an integer value. For example, if the frequency of the clock signal with the highest frequency is 600 MHz and the frequency of the clock signal with the lowest frequency is 35 MHz, then the $V_{PRE\_TIMER2}$=(((600/35)*(1.5))+1)=26.71. Thus, the second predetermined timer value is rounded to 27.

The second timeout control circuit 908 receives the second start timer output signal and the second stop timer output signal. The second timeout control circuit 908 further receives the third, fourth, and fifth clock signals. The second timeout control circuit 908 performs the counting operation for generating the second count value based on the second start timer output signal, compares the second count value with the second predetermined timer value, and generates the second timer reset signal for resetting at least one of the third, fourth, and fifth switchover control circuits 904a, 904b, and 904c when the second count value is equal to the second predetermined timer value. The second timeout control circuit 908 terminates the counting operation based on at least one of the second stop timer output signal and the second comparison signal, i.e., an inverted second timer reset signal.

The fourth combinational logic circuit 910 is connected to the third, fourth, and fifth switchover control circuits 904a, 904b, and 904c for receiving the fifth enable signal, the third enable signal, and the fourth enable signal, respectively. The fourth combinational logic circuit 910 further receives the third, fourth, and fifth clock signals and outputs at least one of the third, fourth, and fifth clock signals as a second clock output signal ($V_{CLK\_OUT2}$) based on the fifth enable signal, the third enable signal, and the fourth enable signal.

In one embodiment, the fourth combinational logic circuit 910 includes twenty-first through twenty-third logic gates 920a-920c. The twenty-first through twenty-third logic gates 920a-920c are AND gates. The fourth combinational logic circuit 910 further includes a twenty-fourth logic gate 922. The twenty-fourth logic gate 922 is an OR gate. The twenty-first logic gate 920a has a first input terminal for receiving the third clock signal and a second input terminal connected to the third switchover control circuit 904a for receiving the fifth enable signal. The twenty-first logic gate 920a has an output terminal for generating a fifth intermediate signal ($V_{INT5}$). The twenty-second logic gate 920b has a first input terminal for receiving the fourth clock signal and a second input terminal connected to the fourth switchover control circuit 904b for receiving the third enable signal. The twenty-second logic gate 920b has an output terminal for generating a sixth intermediate signal ($V_{INT6}$). The twenty-third logic gate 920c has a first input terminal for receiving the fifth clock signal and a second input terminal connected to the fifth switchover control circuit 904c for receiving the fourth enable signal. The twenty-third logic gate 920c generates a seventh intermediate signal ($V_{INT7}$) at its output terminal.

The twenty-fourth logic gate 922, which in a preferred embodiment is an OR gate or its functional equivalent, has a first input terminal connected to the output terminal of the twenty-first logic gate 920a for receiving the fifth intermediate signal, a second input terminal connected to the output terminal of the twenty-second logic gate 920b for receiving the sixth intermediate signal, and a third input terminal connected to the output terminal of the twenty-third logic gate 920c for receiving the seventh intermediate signal. The twenty-fourth logic gate 922 generates the second clock output signal at its output terminal.

Figure 9:
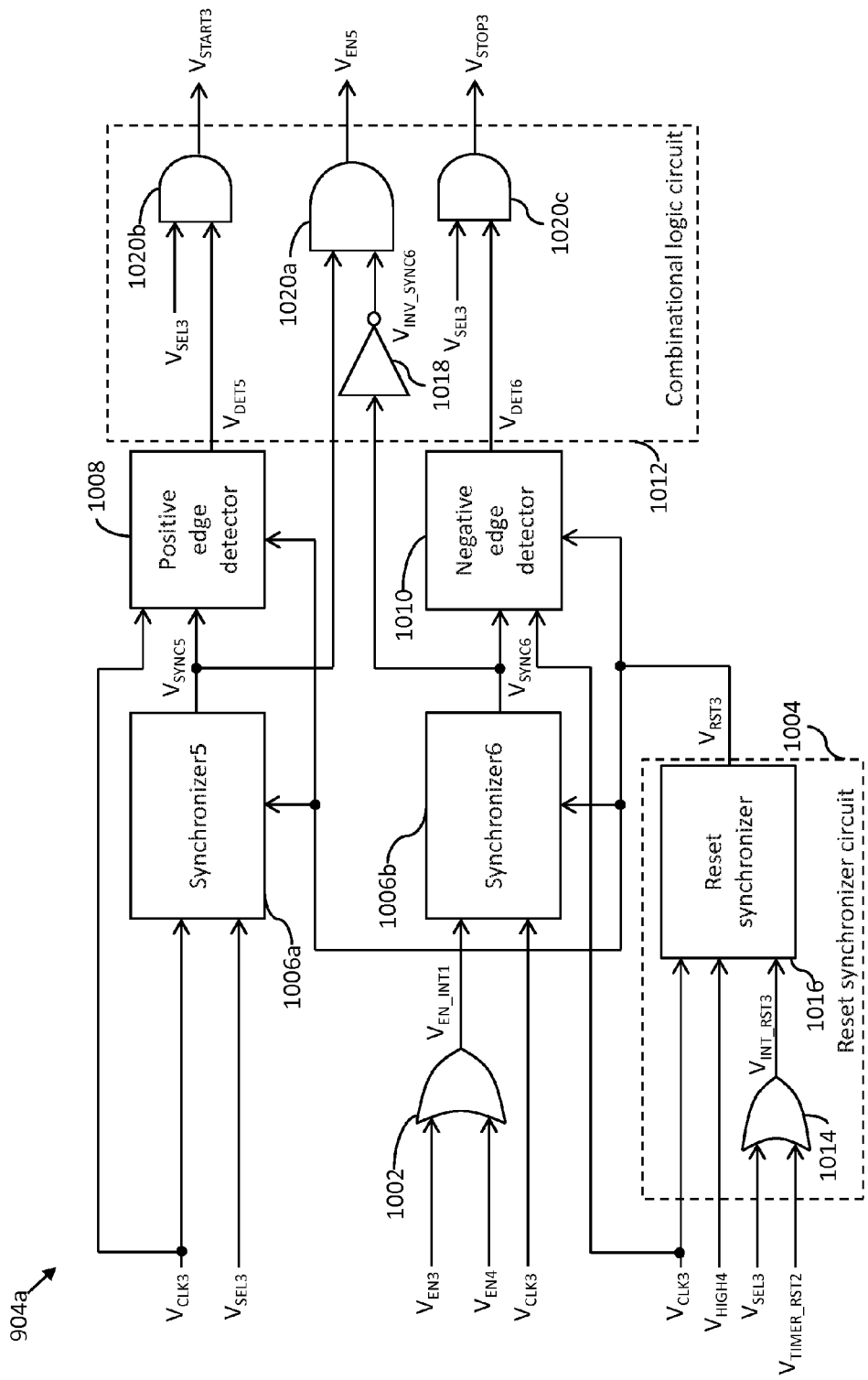
FIG. 9 is a schematic block diagram of the third switchover control circuit of FIG. 8 in accordance with another embodiment of the present invention.

Referring now to FIG. 9, a schematic block diagram of the third switchover control circuit 904a in accordance with an embodiment of the present invention is shown. The third switchover control circuit 904a includes a twenty-fifth logic gate 1002, a third reset synchronizer circuit 1004, fifth and sixth synchronizers 1006a and 1006b, a third positive edge detector 1008, a third negative edge detector 1010, and a fifth combinational logic circuit 1012.

The twenty-fifth logic gate 1002 has a first input terminal connected to the fourth switchover control circuit 904b for receiving the third enable signal and a second input terminal connected to the fifth switchover control circuit 904c for receiving the fourth enable signal. The twenty-fifth logic gate 1002 has an output terminal for generating a first intermediate enable signal ($V_{EN\_INT1}$). In one embodiment, the twenty-fifth logic gate 1002 is an OR gate or its functional equivalent.

The third reset synchronizer circuit 1004 receives the third clock signal and the fourth logic high signal and is connected to the first output terminal of the second decoder 902 and the output terminal of the second NOT gate 919 for receiving the third select signal and the second timer reset signal, respectively. The third reset synchronizer circuit 1004 generates a third reset synchronizer signal ($V_{RST3}$). The third reset synchronizer circuit 1004 includes a twenty-sixth logic gate 1014 and a third reset synchronizer 1016.

The twenty-sixth logic gate 1014 has a first input terminal connected to the first output terminal of the second decoder 902 for receiving the third select signal and a second input terminal connected to the output terminal of the second NOT gate 919 for receiving the second timer reset signal. The twenty-sixth logic gate 1014 has an output terminal for generating a third intermediate reset signal ($V_{INT\_RST3}$). In one embodiment, the twenty-sixth logic gate 1014 is an OR gate or its functional equivalent.

The third reset synchronizer 1016 receives the third clock signal and the fourth logic high signal and is connected to the output terminal of the twenty-sixth logic gate 1014 for receiving the third intermediate reset signal. The third reset synchronizer 1016 generates the third reset synchronizer signal. The third reset synchronizer 1016 is structurally and functionally similar to the first reset synchronizer 214 of FIG. 3A.

The fifth synchronizer 1006a receives the third clock signal and is connected to the first output terminal of the second decoder 902 and the third reset synchronizer 1016 for receiving the third select signal and the third reset synchronizer signal, respectively. The fifth synchronizer 1006a generates a fifth synchronizer signal ($V_{SYNC5}$). The fifth synchronizer 1006a is structurally and functionally similar to the first synchronizer 204a of FIG. 3B.

The sixth synchronizer 1006b receives the third clock signal and is connected to the output terminal of the twenty-fifth logic gate 1002 and the third reset synchronizer 1016 for receiving the first intermediate enable signal and the third reset synchronizer signal, respectively. The sixth synchronizer 1006b generates a sixth synchronizer signal ($V_{SYNC6}$). The sixth synchronizer 1006b is structurally and functionally similar to the first synchronizer 204a of FIG. 3B.

The third positive edge detector 1008 receives the third clock signal and is connected to the third reset synchronizer 1016 and the fifth synchronizer 1006a for receiving the third reset synchronizer signal and the fifth synchronizer signal, respectively. The third positive edge detector 1008 generates a fifth detector output signal ($V_{DET5}$). The third positive edge detector 1008 is structurally and functionally similar to the first positive edge detector 206 of FIG. 4A.

The third negative edge detector 1010 receives the third clock signal and is connected to the third reset synchronizer 1016 and the sixth synchronizer 1006b for receiving the third reset synchronizer signal and the sixth synchronizer signal, respectively. The third negative edge detector 1010 generates a sixth detector output signal ($V_{DET6}$). The third negative edge detector 1010 is structurally and functionally similar to the first negative edge detector 208 of FIG. 4B.

The fifth combinational logic circuit 1012 is connected to the fifth and sixth synchronizers 1006a and 1006b for receiving the fifth and sixth synchronizer signals, respectively, connected to the third positive edge detector 1008 and the third negative edge detector 1010 for receiving the fifth and sixth detector output signals, respectively, and connected to the first output terminal of the second decoder 902 for receiving the third select signal. The fifth combinational logic circuit 1012 generates the fifth enable signal based on the fifth and sixth synchronizer signals, generates the third start timer signal based on the third select signal and the fifth detector output signal, and generates the third stop timer signal based on the third select signal and the sixth detector output signal.

In one embodiment, the fifth combinational logic circuit 1012 includes a twenty-seventh logic gate 1018. The twenty-seventh logic gate 1018 is a NOT gate. The fifth combinational logic circuit 1012 further includes twenty-eighth through thirtieth logic gates 1020a-1020c. The twenty-eighth through thirtieth logic gates 1020a-1020c are AND gates. The twenty-seventh logic gate 1018 has an input terminal connected to the sixth synchronizer 1006b for receiving the sixth synchronizer signal and an output terminal for generating an inverted version of the sixth synchronizer signal ($V_{INV\_SYNC6}$) (hereinafter referred to as an "inverted sixth synchronizer signal"). The twenty-eighth logic gate 1020a has a first input terminal connected to the fifth synchronizer 1006a for receiving the fifth synchronizer signal and a second input terminal connected to the output terminal of the twenty-seventh logic gate 1018 for receiving the inverted sixth synchronizer signal. The twenty-eighth logic gate 1020a has an output terminal for generating the fifth enable signal. The twenty-ninth logic gate 1020b has a first input terminal connected to the first output terminal of the second decoder 902 for receiving the third select signal and a second input terminal connected to the third positive edge detector 1008 for receiving the fifth detector output signal. The twenty-ninth logic gate 1020b has an output terminal for generating the third start timer signal. The thirtieth logic gate 1020c has a first input terminal connected to the first output terminal of the second decoder 902 for receiving the third select signal and a second input terminal connected to the third negative edge detector 1010 for receiving the sixth detector output signal. The thirtieth logic gate 1020c has an output terminal for generating the third stop timer signal.

As previously discussed, the fourth and fifth switchover control circuits 904b and 904c preferably comprise the same design as the third switchover control circuit 904a shown in FIG. 9.

Figure 10:
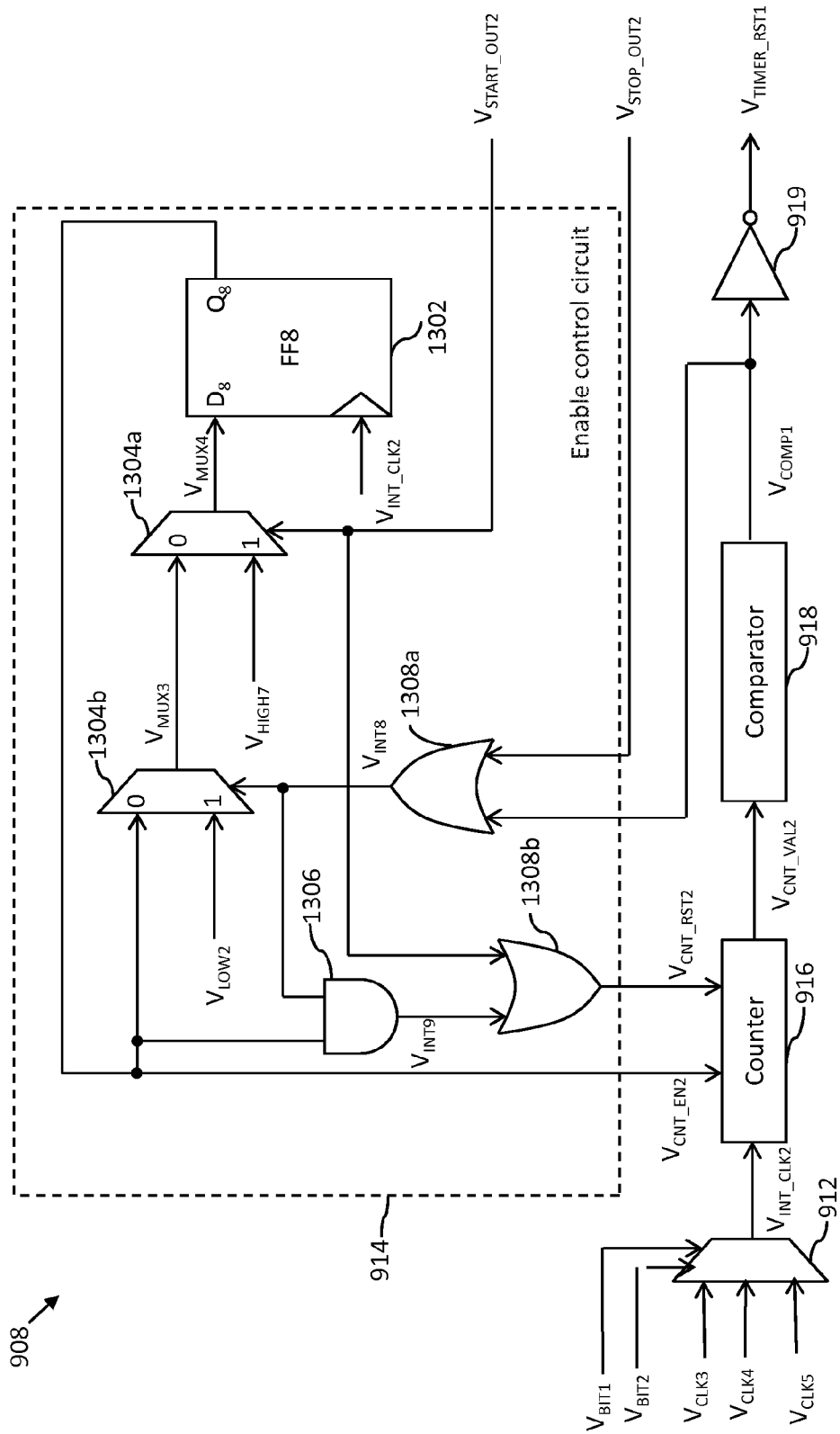
FIG. 10 is a schematic block diagram of the second timeout control circuit of FIG. 8 in accordance with another embodiment of the present invention.

Referring now to FIG. 10, a schematic block diagram of the second timeout control circuit 908 in accordance with an embodiment of the present invention is shown. The second timeout control circuit 908 includes the eighth mux 912, the second enable control circuit 914, the second counter 916, the second comparator 918, and the second NOT gate 919. The second enable control circuit 914 includes an eighth flip-flop 1302, ninth and tenth muxes 1304a and 1304b, and a forty-third logic gate 1306. In one embodiment, the forty-third logic gate 1306 is an AND gate or its functional equivalent. The second enable control circuit 914 further includes forty-fourth and forty-fifth logic gates 1308a and 1308b, which in the embodiment shown comprise OR gates.

The ninth mux 1304a has a first input terminal for receiving a third mux output signal ($V_{MUX3}$), a second input terminal for receiving a seventh logic high signal ($V_{HIGH7}$), and a select terminal connected to the output terminal of the sixth mux 906a for receiving the second start timer output signal. Based on the second start timer output signal, the ninth mux 1304a selects and outputs one of the third mux output signal and the seventh logic high signal as a fourth mux output signal ($V_{MUX4}$) at its output terminal. When the second start timer output signal is low, the ninth mux 1304a selects and outputs the third mux output signal as the fourth mux output signal, and when the second start timer output signal is high, the ninth mux 1304a selects and outputs the seventh logic high signal as the fourth mux output signal.

The eighth flip-flop 1302 has an input terminal connected to the output terminal of the ninth mux 1304a for receiving the fourth mux output signal and a clock terminal connected to the output terminal of the eighth mux 912 for receiving the second intermediate clock signal. The eighth flip-flop 1302 has an output terminal for providing the second counter enable signal.

The tenth mux 1304b has a first input terminal connected to the output terminal of the eighth flip-flop 1302 for receiving the second counter enable signal, a second input terminal for receiving a tied low signal ($V_{LOW2}$), and a select terminal for receiving an eighth intermediate signal ($V_{INT8}$). The tenth mux 1304b has an output terminal for outputting the third mux output signal. Based on the eighth intermediate signal, the tenth mux 1304b selects and outputs one of the second counter enable signal and the tied low signal as the third mux output signal at its output terminal. When the eighth intermediate signal is low, the tenth mux 1304b selects and outputs the second counter enable signal as the third mux output signal, and when the eighth intermediate signal is high, the tenth mux 1304b selects and outputs the tied low signal as the third mux output signal.

The forty-third logic gate 1306 has a first input terminal for receiving the eighth intermediate signal and a second input terminal connected to the output terminal of the eighth flip-flop 1302 for receiving the second counter enable signal. The forty-third logic gate 1306 has an output terminal for generating a ninth intermediate signal ($V_{INT9}$).

The forty-fourth logic gate 1308a has a first input terminal connected to the output terminal of the seventh mux 906b for receiving the second stop timer output signal and a second input terminal connected to the second comparator 918 for receiving the second comparison signal. The forty-fourth logic gate 1308a has an output terminal for generating the eighth intermediate signal.

The forty-fifth logic gate 1308b has a first input terminal connected to the output terminal of the forty-third logic gate 1306 for receiving the ninth intermediate signal and a second input terminal connected to the output of the sixth mux 906a for receiving the second start timer output signal, and generates the second counter reset signal at its output terminal.

Figure 11A:
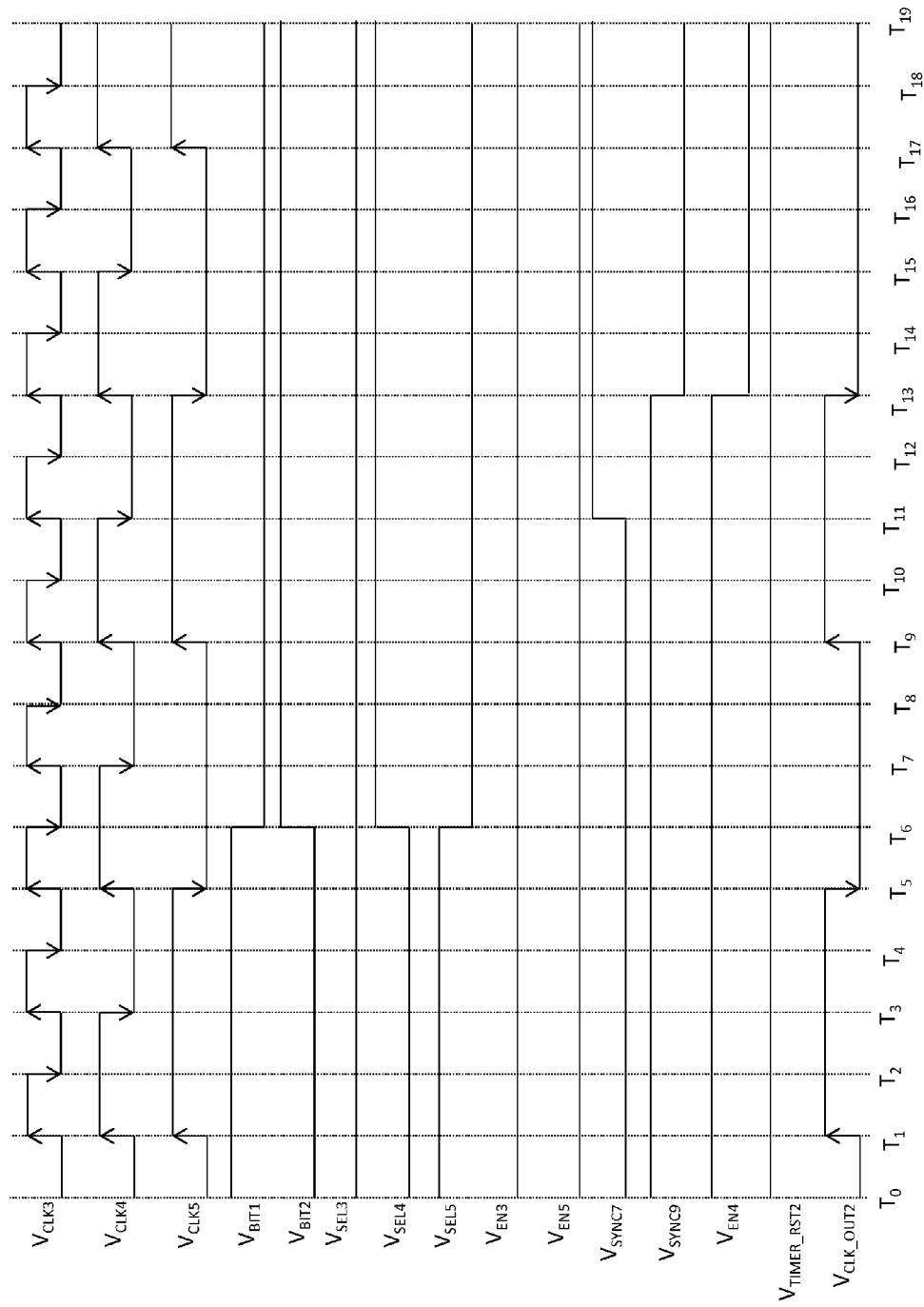
FIGS. 11A and 11B are a timing diagram illustrating a switching operation of the clock switching system of FIG. 8 when a currently selected clock signal is active in accordance with another embodiment of the present invention.
Figure 11B:
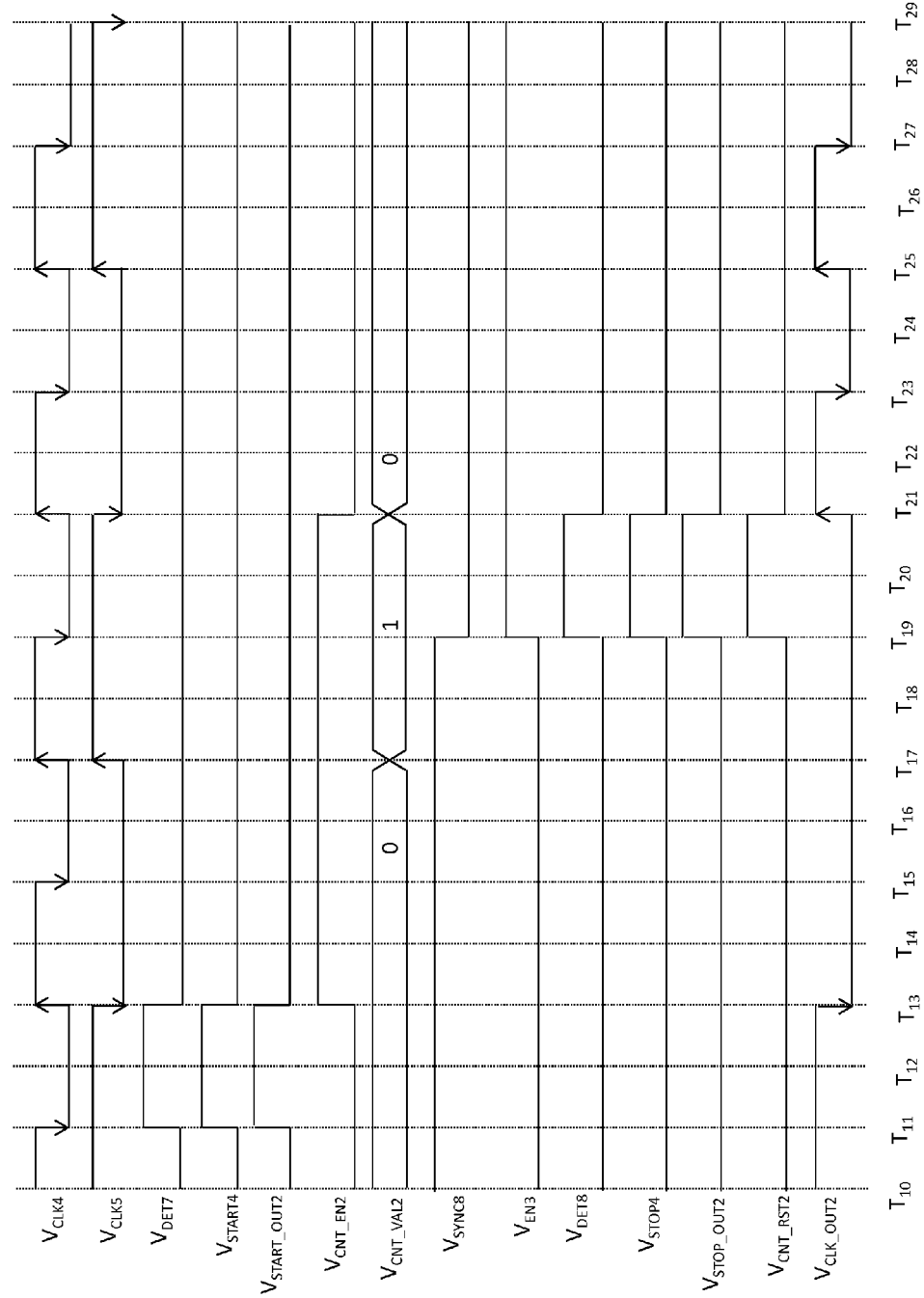

Referring now to FIGS. 11A and 11B, a timing diagram illustrating a switching operation of the second clock switching system 900 when a currently selected clock signal is active is shown. In this example, a frequency of the third clock signal is 40 MHz, a frequency of the fifth clock signal is 10 MHz, and the second predetermined timer value is 7.

From time $T_0$-$T_6$, the first bit signal high and the second bit signal low so the third and fourth select signals are both low and the fifth select signal is high. The fourth enable signal is at logic high state and the third and fifth enable signals are at logic low state. Thus, the twenty-fourth logic gate 922 outputs the fifth clock signal as the second clock output signal since the currently selected clock signal is the fifth clock signal.

From time $T_6$-$T_{11}$, the first bit signal transitions from high to low and the second bit signal transitions from low to high. The second decoder 902 generates the fourth select signal at logic high state and the fifth select signal at logic low state. The seventh synchronizer 1106a receives the high fourth select signal and the ninth synchronizer 1206a receives the low fifth select signal.

From time $T_{11}$-$T_{13}$, the seventh synchronizer 1106a generates the seventh synchronizer signal at logic high state. The fourth positive edge detector 1108 receives the high seventh synchronizer signal and generates a low seventh detector output signal. The thirty-fifth logic gate 1120b receives the high fourth select signal and the high seventh detector output signal and generates a high fourth start timer signal. Since the sixth mux 906a receives the first and second bit signals at "01", respectively, the sixth mux 906a outputs a high second start timer output signal.

From time $T_{13}$-$T_{17}$, the ninth synchronizer 1206a generates a low ninth synchronizer signal. The fortieth logic gate 1220a receives the low ninth synchronizer signal and generates the fourth enable signal at logic low state. The fourth positive edge detector 1108 generates the seventh detector output signal at logic low state. The thirty-fifth logic gate 1120b generates a low fourth start timer signal. The sixth mux 906a outputs the second start timer output signal at logic low state. The second enable control circuit 914 generates the second counter enable signal at logic high state. Since the fourth enable signal is low, the twenty-fourth logic gate 922 does not output the fifth clock signal as the second clock output signal.

From time period $T_{17}$-$T_{19}$, the second counter 916 receives a high second counter enable signal and starts the counting operation.

From time $T_{19}$-$T_{21}$, the eighth synchronizer 1106b generates a low eighth synchronizer signal. The thirty-third logic gate 1118 receives the low eighth synchronizer signal and generates the inverted eighth synchronizer signal at logic high state. The thirty-fourth logic gate 1120a receives the high seventh synchronizer signal and the low inverted eighth synchronizer signal and generates the third enable signal at logic high state.

The fourth negative edge detector 1110 generates the eighth detector output signal at logic high state. The thirty-sixth logic gate 1120c receives the fourth select signal at logic high state and the eighth detector output signal at logic high state, and generates the fourth stop timer signal at logic high state. Since the seventh mux 906b receives the first and second bit signals of "01", the seventh mux 906b outputs the second stop timer output signal at logic high state. The second enable control circuit 914 generates the second counter reset signal at logic high state.

From time $T_{21}$-$T_{29}$, the fourth negative edge detector 1110 generates the eighth detector output signal at logic low state. The thirty-sixth logic gate 1120c generates the fourth stop timer signal at logic low state. The seventh mux 906b outputs the second stop timer output signal at logic low state and the second enable control circuit 914 generates the second counter enable signal at logic low state. The second enable control circuit 914 receives the second stop timer output signal at logic low state and generates the second counter enable signal at logic low state. Since the second count value is less than the second predetermined timer value (which in this example is 7), the second comparator 918 generates a low second comparison signal. Thus, the second NOT gate 919 generates the second timer reset signal at logic high state. The second enable control circuit 914 generates the second counter reset signal at logic low state. The second counter 916 terminates the counting operation and is reset. The twenty-fourth logic gate 922 generates the fourth clock signal as the second clock output signal.

Since the fourth enable signal transitions from high to low at time $T_{13}$ and the third enable signal transitions from low to high at time $T_{19}$, the fourth and third enable signals are non-overlapping. Hence, the twenty-fourth logic gate 922 does not output either of the fourth or fifth clock signals as the first clock output signal during time $T_{13}$ to $T_{19}$, so glitch-free switching between the fifth and fourth clock signals is provided. Further, as the fifth clock signal is active during the switching operation, the second timeout control circuit 908 does not enable the second timer reset signal during the switching operation and hence, generates the second timer reset signal at logic high state.

Figure 12A:
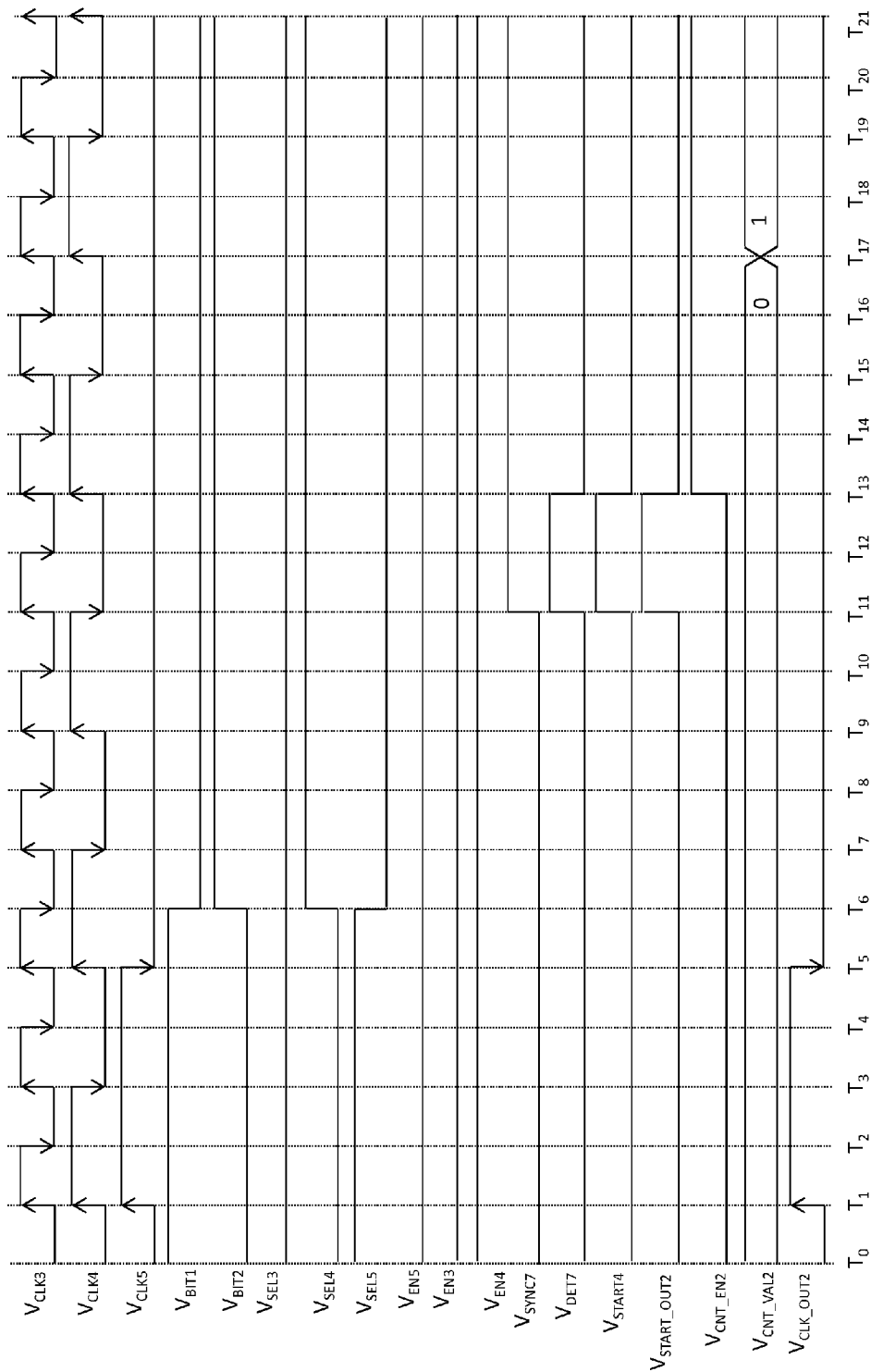
FIGS. 12A, 12B, and 12C are a timing diagram illustrating a switching operation of the clock switching system of FIG. 8 when a currently selected clock signal is inactive in accordance with another embodiment of the present invention.
Figure 12B:
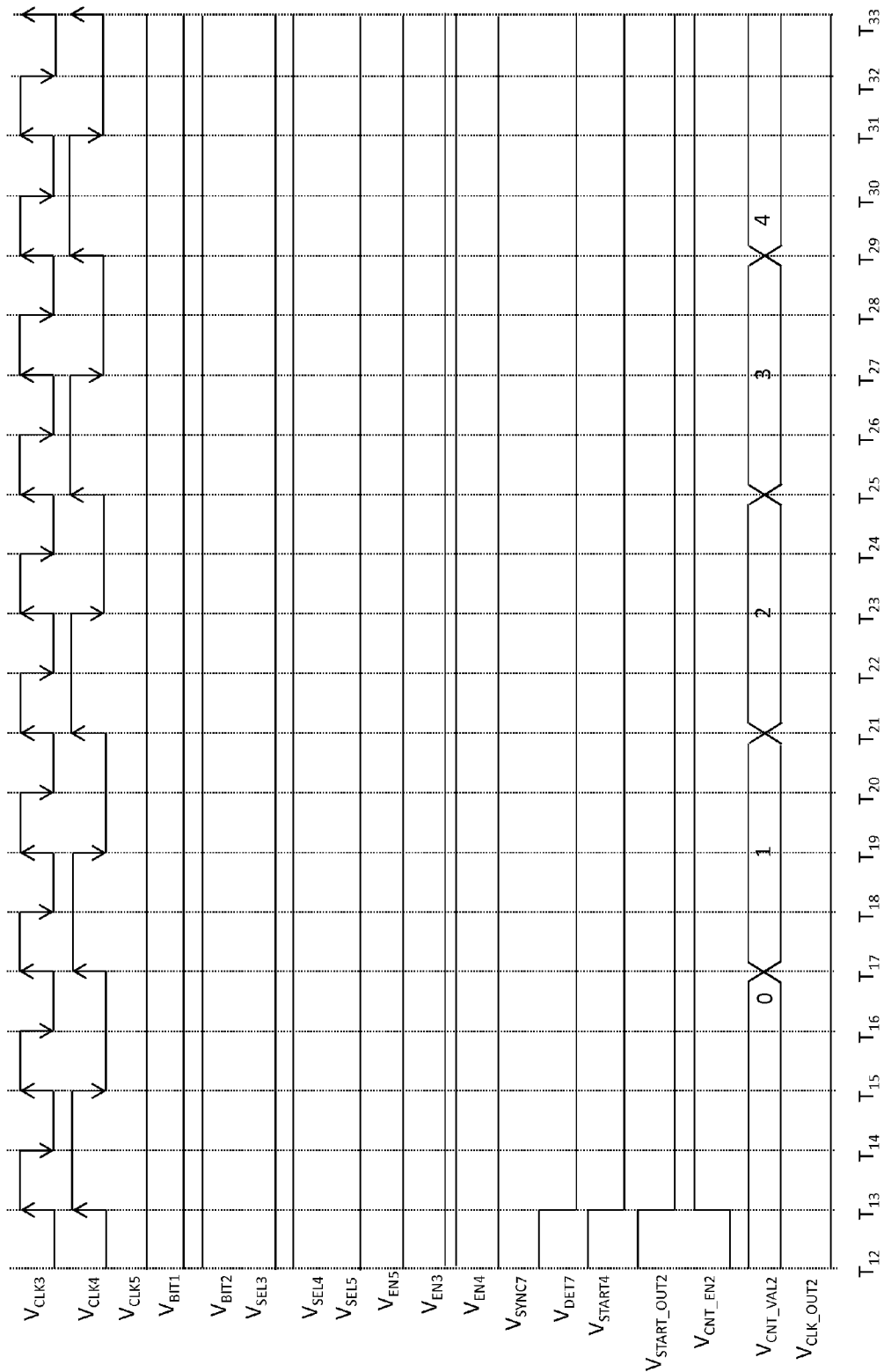
Figure 12C:
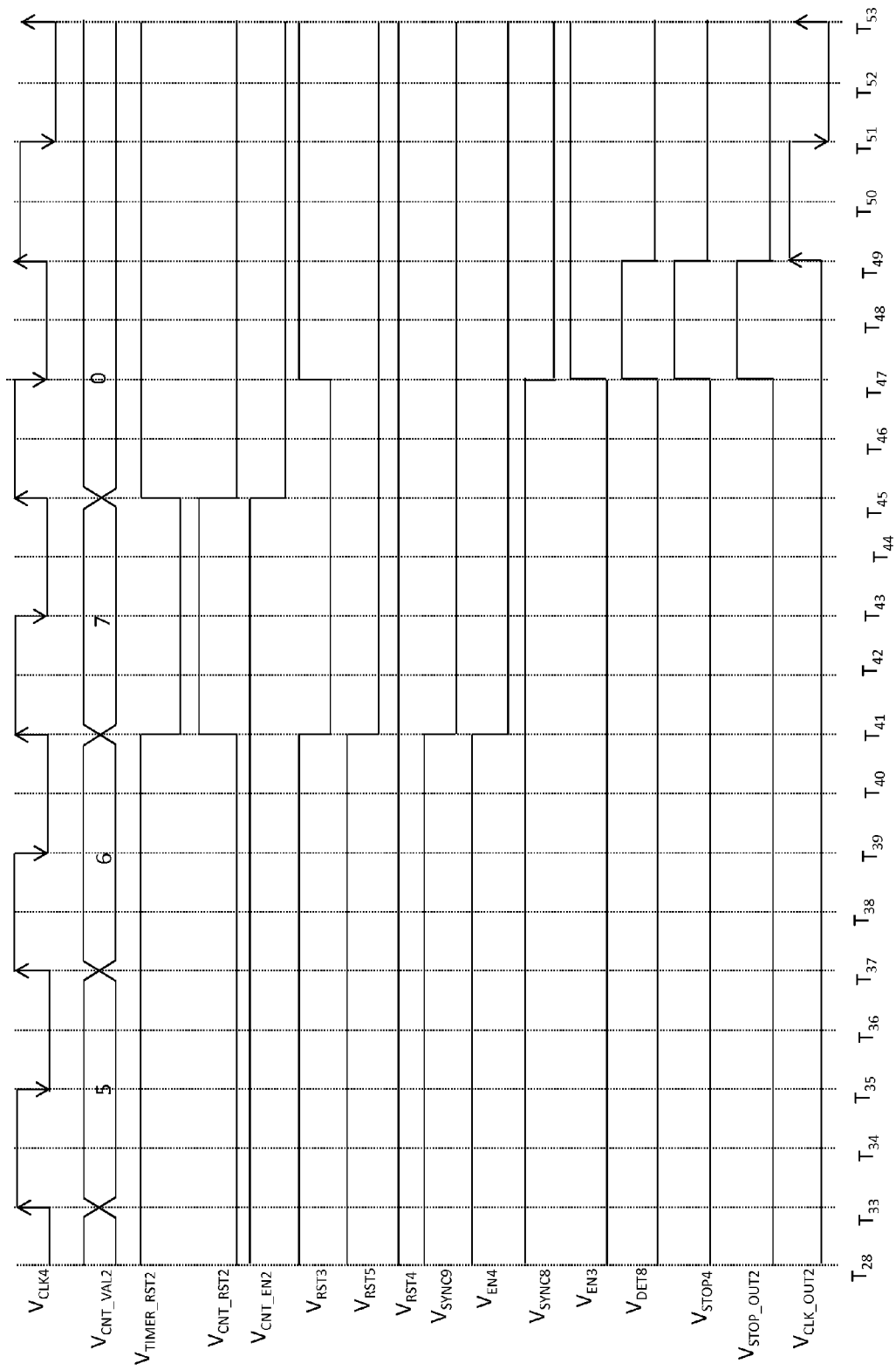

Referring now to FIGS. 12A-12C, a timing diagram illustrating a switching operation of the second clock switching system 900 when a currently selected clock signal is inactive is shown.

From time period $T_0$-$T_5$, the first and second bit signals are at "10". Hence, the fifth select signal is high and the third and fourth select signals are low. The fourth enable signal is at high and the third and fifth enable signals are low. Thus, the twenty-fourth logic gate 922 outputs the fifth clock signal as the second clock output signal, so the currently selected clock signal is the fifth clock signal.

After time $T_5$, the fifth clock signal is inactive so the twenty-fourth logic gate 922 does not output the fifth clock signal as the second clock output signal.

From time $T_6$-$T_{11}$, the first bit signal transitions from high to low and the second bit signal transitions from low to high. Thus, the second decoder 902 generates a high fourth select signal and a low fifth select signal.

From time period $T_{11}$-$T_{13}$, the seventh synchronizer 1106a generates a high seventh synchronizer signal. The fourth positive edge detector 1108 receives the high seventh synchronizer signal and generates a high seventh detector output signal. The thirty-fifth logic gate 1120b receives the fourth select signal at logic high state and the seventh detector output signal at logic high state, and generates the fourth start timer signal at logic high state. The sixth mux 906a receives the high fourth start timer signal and outputs the second start timer output signal at logic high state.

From time $T_{13}$-$T_{17}$, the fourth positive edge detector 1108 generates the seventh detector output signal at logic low state. The thirty-fifth logic gate 1120b generates the fourth start timer signal at logic low state. The sixth mux 906a outputs the second start timer output signal at logic low state. The second enable control circuit 914 generates the second counter enable signal at logic high state. The second counter 916 receives the second counter enable signal at logic high state.

From time $T_{17}$-$T_{41}$, the second counter 916 counts the second count value. Since the second count value is less than the second predetermined timer value, the second comparator 918 generates a low second comparison signal, and the second NOT gate 919 generates a high second timer reset signal.

From time period $T_{41}$-$T_{45}$, the second count value is 7. Since the second count value is equal to the second predetermined timer value, the second comparator 918 generates a high second comparison signal so the second NOT gate 919 generates a low second timer reset signal. The second enable control circuit 914 receives the high second comparison signal and generates a high second counter reset signal.

The twenty-sixth logic gate 1014 receives the third select signal at logic low state and the second timer reset signal at logic low state and generates the third intermediate reset signal at logic low state. The third reset synchronizer 1016 receives the third intermediate reset signal at logic low state and generates the third reset synchronizer signal at logic low state, which resets the fifth and sixth synchronizers 1006a and 1006b and the third positive and negative edge detectors 1008 and 1010. Thus, the third switchover control circuit 904a is reset.

The thirty-eighth logic gate 1214 receives the fifth select signal at logic low state and the second timer reset signal at logic low state, and generates the fifth intermediate reset signal at logic low state. The fifth reset synchronizer 1216 receives the low fifth intermediate reset signal and generates the fifth reset synchronizer signal at logic low state, which resets the ninth and tenth synchronizers 1206a and 1206b and the fifth positive and negative edge detectors 1208 and 1210. Thus, the ninth synchronizer 1206a generates the ninth synchronizer signal at logic low state. The fortieth logic gate 1220a receives the ninth synchronizer signal at logic low state and generates the fourth enable signal at logic low state, which resets the fifth switchover control circuit 904c.

The thirty-second logic gate 1114 receives the fourth select signal at logic high state and the second timer reset signal at logic low state, and generates the fourth intermediate reset signal at logic high state. The fourth reset synchronizer 1116 receives the high fourth intermediate reset signal, so the fourth reset synchronizer 1116 generates the fourth reset synchronizer signal at logic high state. Hence, the fourth switchover control circuit 904b does not reset.

From time $T_{45}$-$T_{47}$, the second comparator 918 generates the second comparison signal at logic low state. The second NOT gate 919 generates the second timer reset signal at logic high state. The second enable control circuit 914 generates the second counter enable signal at logic low state. The second enable control circuit 914 generates the second counter reset signal at logic low state, so the second counter 916 stops counting and is reset. The twenty-sixth logic gate 1014 receives the second timer reset signal at logic high state and generates the third intermediate reset signal at logic high state. The third reset synchronizer 1016 receives the third intermediate reset signal at logic high state.

From time $T_{47}$-$T_{49}$, the third reset synchronizer 1016 generates the third reset synchronizer signal at logic high state. The third switchover control circuit 904a comes out of reset. The eighth synchronizer 1106b generates the eighth synchronizer signal at logic low state. The thirty-third logic gate 1118 receives the low eighth synchronizer signal and generates the inverted eighth synchronizer signal at logic high state. The thirty-fourth logic gate 1120a receives the seventh synchronizer signal at logic high state and the inverted eighth synchronizer signal at logic high state, and generates the third enable signal at logic high state. The fourth negative edge detector 1110 generates the eighth detector output signal at logic high state and the thirty-sixth logic gate 1120c generates the fourth stop timer signal at logic high state. Thus, the seventh mux 906b outputs the second stop timer output signal at logic high state.

From time $T_{49}$-$T_{53}$, the fourth negative edge detector 1110 generates a low eighth detector output signal so the thirty-sixth logic gate 1120c generates a low fourth stop timer signal. The seventh mux 906b outputs the second stop timer output signal at logic low state. The twenty-fourth logic gate 922 generates the fourth clock signal as the second clock output signal.

Since the fourth enable signal transitions from high to low at time $T_{41}$ and the third enable signal transitions from low to high at time $T_{47}$ the fourth and third enable signals are non-overlapping. Hence, the twenty-fourth logic gate 922 does not output either of the fifth and fourth clock signals as the second clock output signal from time $T_{41}$-$T_{47}$, so glitch-free switching between the fifth and fourth clock signals is provided.

The second clock switching system 900 switches from the fifth clock signal to the fourth clock signal even when the fifth clock signal is inactive. Further, as the fifth clock signal is inactive during the switching operation, the second timeout control circuit 908 enables the second timer reset signal during the switching operation and hence, generates a low second timer reset signal for resetting the third and fifth switchover control circuits 904a and 904c.

It will be apparent to those of skill in the art that when the second clock switching system 900 provides switching from the fifth clock signal to the fourth clock signal and the fifth clock signal is inactive, all switchover control circuits except the switchover control circuit that is performing functions using the fourth clock signal are reset. Thus, the second clock switching system 900 can be utilized for providing the second clock output signal at various clock frequencies, i.e., the second clock switching system 900 can provide switching between multiple clock signals.

It will be understood by those of skill in the art that the present invention can be extended to switching between more than three clock signals.

It will be understood by those of skill in the art that the same logical function may be performed by different arrangements of logic gates, or that logic circuits operate using either positive or negative logic signals. Therefore, variations in the arrangement of some of the logic gates described above should not be considered to depart from the scope of the present invention. No element, act, or instruction used in the present application should be construed as critical or essential to the invention unless explicitly described as such. Further, the phrase "based on" is intended to mean "based, at least in part, on" unless explicitly stated otherwise.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A clock multiplexer for providing a glitch-free clock output signal, comprising:
    a decoder that receives a select signal and generates first and second select signals;
    a first switchover control circuit that (i) receives a timer reset signal, a first clock signal, and a first enable signal, (ii) is connected to the decoder for receiving the first select signal, and (iii) generates a second enable signal, a first start timer signal, and a first stop timer signal;
    a second switchover control circuit that (i) receives the timer reset signal and a second clock signal, (ii) is connected to the decoder for receiving the second select signal and to the first switchover control circuit for receiving the second enable signal, and (iii) generates the first enable signal, a second start timer signal, and a second stop timer signal;
    a first multiplexer having input terminals for receiving the first and second start timer signals, and a select terminal for receiving the select signal, and an output terminal for outputting a start timer output signal;
    a second multiplexer having input terminals for receiving the first and second stop timer signals, and a select terminal for receiving the select signal, and an output terminal for outputting a stop timer output signal;
    a timeout control circuit that (i) receives one of the first and second clock signals, (ii) receives the start timer output signal and the stop timer output signal, (iii) performs a counting operation to generate a count value based on the start timer output signal, (iv) compares the count value with a predetermined timer value, (v) generates the timer reset signal for resetting at least one of the first and second switchover control circuits when the count value is equal to the predetermined timer value, and (vi) stops the counting operation based on at least one of the stop timer output signal and the timer reset signal; and
    a first combinational logic circuit that (i) receives the first and second clock signals, (ii) is connected to the first and second switchover control circuits for receiving the second and first enable signals, and (iii) outputs one of the first and second clock signals as the clock output signal based on the first and second enable signals.

2. The clock multiplexer of claim 1, wherein the first switchover control circuit comprises:
- a first reset synchronizer circuit that receives the first clock signal and a tied high signal, and is connected to the decoder and the timeout control circuit for receiving the first select signal and the timer reset signal, respectively, and generates a first reset synchronizer signal;
- a first synchronizer that receives the first clock signal, and is connected to the decoder and the first reset synchronizer circuit for receiving the first select signal and the first reset synchronizer signal, respectively, and generates a first synchronizer signal;
- a second synchronizer that receives the first clock signal, and is connected to the second switchover control circuit and the first reset synchronizer circuit for receiving the first enable signal and the first reset synchronizer signal, respectively, and generates a second synchronizer signal;
- a first positive edge detector that receives the first clock signal, and is connected to the first reset synchronizer circuit and the first synchronizer for receiving the first reset synchronizer signal and the first synchronizer signal, respectively, and generates a first detector output signal;
- a first negative edge detector that receives the first clock signal, and is connected to the first reset synchronizer circuit and the second synchronizer for receiving the first reset synchronizer signal and the second synchronizer signal, respectively, and generates a second detector output signal; and
- a second combinational logic circuit (i) connected to the first and second synchronizers for receiving the first and second synchronizer signals, respectively, (ii) connected to the first positive edge detector and the first negative edge detector for receiving the first and second detector output signals, respectively, and (iii) connected to the first output terminal of the decoder for receiving the first select signal, and (iv) generates the second enable signal based on the first and second synchronizer signals, (v) generates the first start timer signal based on the first select signal and the first detector output signal, and (vi) generates the first stop timer signal based on the first select signal and the second detector output signal.

3. The clock multiplexer of claim 2, wherein the second switchover control circuit comprises:
- a second reset synchronizer circuit that receives the second clock signal and a second tied high signal, and is connected to the decoder and the timeout control circuit for receiving the second select signal and the timer reset signal, respectively, and generates a second reset synchronizer signal;
- a third synchronizer that receives the second clock signal, and is connected to the decoder and the second reset synchronizer circuit for receiving the second select signal and the second reset synchronizer signal, respectively, and generates a third synchronizer signal;
- a fourth synchronizer that receives the second clock signal, and is connected to the first switchover control circuit and the second reset synchronizer circuit for receiving the second enable signal and the second reset synchronizer signal, respectively, and generates a fourth synchronizer signal;
- a second positive edge detector that receives the second clock signal, and is connected to the second reset synchronizer circuit and the third synchronizer for receiving the second reset synchronizer signal and the third synchronizer signal, respectively, and generates a third detector output signal;
- a second negative edge detector that receives the second clock signal, and is connected to the second reset synchronizer circuit and the fourth synchronizer for receiving the second reset synchronizer signal and the fourth synchronizer signal, respectively, and generates a fourth detector output signal; and
- a third combinational logic circuit (i) connected to the third and fourth synchronizers for receiving the third and fourth synchronizer signals, respectively, (ii) connected to the second positive edge detector and the second negative edge detector for receiving the third and fourth detector output signals, respectively, and (iii) connected to the second output terminal of the decoder for receiving the second select signal, and (iv) generates the first enable signal based on the third and fourth synchronizer signals, (v) generates the second start timer signal based on the second select signal and the third detector output signal, and (vi) generates the second stop timer signal based on the second select signal and the fourth detector output signal.

4. The clock multiplexer of claim 1, wherein the decoder generates the first select signal at logic high state when the select signal is at logic low state and the second select signal at logic high state when the select signal is at logic high state.

5. The clock multiplexer of claim 4, wherein the first combinational logic circuit outputs the first clock signal as the clock output signal when the first select signal is at logic high state and the second clock signal as the clock output signal when the second select signal is at logic high state.

6. The clock multiplexer of claim 4, wherein the timeout control circuit generates the timer reset signal when a logic state of the select signal changes from logic low state to logic high state and the first clock signal is absent, thereby resetting the first switchover control circuit.

7. The clock multiplexer of claim 4, wherein the timeout control circuit generates the timer reset signal when a logic state of the select signal changes from logic high state to logic low state and the second clock signal is absent, thereby resetting the second switchover control circuit.

8. The clock multiplexer of claim 1, wherein the first combinational logic circuit comprises:
- a first logic gate that receives the first clock signal and the second enable signal, and outputs a first intermediate signal;
- a second logic gate that receives the second clock signal and the first enable signal, and outputs a second intermediate signal; and
- a third logic gate that receives the first and second intermediate signals, and outputs the clock output signal.

9. The clock multiplexer of claim 1, wherein the timeout control circuit comprises:
- a third multiplexer that receives the first and second clock signals, and has a select terminal that receive the select signal, and an output terminal that outputs an intermediate clock signal;
- an enable control circuit that (i) receives a comparison signal, (ii) is connected to the first, second, and third multiplexers for receiving the start timer output signal, the stop timer output signal, and the intermediate clock signal, respectively, and (iii) generates a counter enable signal based on the start timer output signal, and (iv) generates a counter reset signal based on at least one of the start timer output signal, the comparison signal, and the stop timer output signal;
a counter connected to the third multiplexer for receiving the intermediate clock signal, and connected to the enable control circuit for receiving the counter enable signal and the counter reset signal, wherein the counter generates the count value based on the counter enable signal and terminates the counting operation based on at least one of the counter enable signal and the counter reset signal;
a comparator connected to the counter for receiving the count value, comparing the count value with the predetermined timer value, and generating the comparison signal; and
a NOT gate connected to the comparator for receiving the comparison signal and outputting the timer reset signal for resetting at least one of the first and second switchover control circuits when the count value is equal to the predetermined timer value, wherein the counter is reset by the counter reset signal.

10. A clock multiplexer for generating a glitch free clock output signal, comprising:
a two-bit decoder for receiving first and second bit signals and generating first, second, and third select signals;
a first switchover control circuit for receiving a timer reset signal, a first clock signal, and first and second enable signals, and connected to the decoder for receiving the first select signal, and generating a third enable signal, a first start timer signal, and a first stop timer signal;
a second switchover control circuit for receiving the timer reset signal, a second clock signal, and the second enable signal, and connected to the decoder and the first switchover control circuit for receiving the second select signal and the third enable signal, respectively, and generating the first enable signal, a second start timer signal, and a second stop timer signal;
a third switchover control circuit for receiving the timer reset signal and a third clock signal, and connected to the decoder, the first switchover control circuit, and the second switchover control circuit for receiving the third select signal, the third enable signal, and the first enable signal, respectively, and generating the second enable signal, a third start timer signal, and a third stop timer signal;
a first multiplexer having first, second, and third input terminals connected to the first, second, and third switchover control circuits for receiving the first, second, and third start timer signals, respectively, a two-bit select terminal for receiving the first and second bit signals, and an output terminal for outputting a start timer output signal;
a second multiplexer having first, second, and third input terminals connected to the first, second, and third switchover control circuits for receiving the first, second, and third stop timer signals, respectively, a two-bit select terminal for receiving the first and second bit signals, and an output terminal for outputting a stop timer output signal;
a timeout control circuit for receiving at least one of the first, second, and third clock signals, and connected to the first and second multiplexers for receiving the start timer output signal and the stop timer output signal, respectively, wherein the timeout control circuit performs a counting operation for generating a count value based on the start timer output signal, compares the count value with a predetermined timer value, generates the timer reset signal for resetting at least one of the first, second, and third switchover control circuits when the count value is equal to the predetermined timer value, and terminates the counting operation based on at least one of the stop timer output signal and an inverted timer reset signal; and
a first combinational logic circuit for receiving the first, second, and third clock signals, and connected to the first, second, and third switchover control circuits for receiving the third, first, and second enable signals, respectively, and outputting at least one of the first, second, and third clock signals as a clock output signal based on the first, second, and third enable signals.

11. The clock multiplexer of claim 10, wherein the first switchover control circuit comprises:
a first reset synchronizer circuit for receiving the first clock signal and a tied high signal, and connected to the first output terminal of the decoder and the timeout control circuit for receiving the first select signal and the timer reset signal, respectively, and generating a first reset synchronizer signal;
a first synchronizer for receiving the first clock signal, and connected to the first output terminal of the decoder and the first reset synchronizer circuit for receiving the first select signal and the first reset synchronizer signal, respectively, and generating a first synchronizer signal;
a first logic gate having first and second input terminals connected to the second and third switchover control circuits for receiving the first and second enable signals, respectively, and an output terminal for generating a first intermediate enable signal;
a second synchronizer for receiving the first clock signal, and connected to the first reset synchronizer circuit and the first logic gate for receiving the first reset synchronizer signal and the first intermediate enable signal, respectively, and generating a second synchronizer signal;
a first positive edge detector for receiving the first clock signal, and connected to the first reset synchronizer circuit and the first synchronizer for receiving the first reset synchronizer signal and the first synchronizer signal, respectively, and generating a first detector output signal;
a first negative edge detector for receiving the first clock signal, and connected to the first reset synchronizer circuit and the second synchronizer for receiving the first reset synchronizer signal and the second synchronizer signal, respectively, and generating a second detector output signal; and
a second combinational logic circuit connected to the first and second synchronizers for receiving the first and second synchronizer signals, respectively, connected to the first positive edge detector and the first negative edge detector for receiving the first and second detector output signals, respectively, and connected to the first output terminal of the decoder for receiving the first select signal, and generating the third enable signal based on the first and second synchronizer signals, generating the first start timer signal based on the first select signal and the first detector output signal, and generating the first stop timer signal based on the first select signal and the second detector output signal.

12. The clock multiplexer of claim 11, wherein the second switchover control circuit comprises:
a second reset synchronizer circuit for receiving the second clock signal and a second logic high signal, and connected to the second output terminal of the decoder and the timeout control circuit for receiving the second select signal and the timer reset signal, respectively, and generating a second reset synchronizer signal;

a third synchronizer for receiving the second clock signal, and connected to the second output terminal of the decoder and the second reset synchronizer circuit for receiving the second select signal and the second reset synchronizer signal, respectively, and generating a third synchronizer signal;

a second logic gate having first and second input terminals connected to the first and third switchover control circuits for receiving the third and second enable signals, respectively, and an output terminal for generating a second intermediate enable signal;

a fourth synchronizer for receiving the second clock signal, and connected to the second reset synchronizer circuit and the second logic gate for receiving the second reset synchronizer signal and the second intermediate enable signal, respectively, and generating a fourth synchronizer signal;

a second positive edge detector for receiving the second clock signal, and connected to the second reset synchronizer circuit and the third synchronizer for receiving the second reset synchronizer signal and the third synchronizer signal, respectively, and generating a third detector output signal;

a second negative edge detector for receiving the second clock signal, and connected to the second reset synchronizer circuit and the fourth synchronizer for receiving the second reset synchronizer signal and the fourth synchronizer signal, respectively, and generating a fourth detector output signal; and a third combinational logic circuit connected to the third and fourth synchronizers for receiving the third and fourth synchronizer signals, respectively, connected to the second positive edge detector and the second negative edge detector for receiving the third and fourth detector output signals, respectively, and connected to the second output terminal of the decoder for receiving the second select signal, and generating the first enable signal based on the third and fourth synchronizer signals, generating the second start timer signal based on the second select signal and the third detector output signal, and generating the second stop timer signal based on the second select signal and the fourth detector output signal.

13. The clock multiplexer of claim 12, wherein the third switchover control circuit comprises:

a third reset synchronizer circuit for receiving the third clock signal and a third logic high signal, and connected to the third output terminal of the decoder and the timeout control circuit for receiving the third select signal and the timer reset signal, respectively, and generating a third reset synchronizer signal;

a fifth synchronizer for receiving the third clock signal, and connected to the third output terminal of the decoder and the third reset synchronizer circuit for receiving the third select signal and the third reset synchronizer signal, respectively, and generating a fifth synchronizer signal;

a third logic gate having first and second input terminals connected to the first and second switchover control circuits for receiving the third and first enable signals, respectively, and an output terminal for generating a third intermediate enable signal;

a sixth synchronizer for receiving the third clock signal, and connected to the third reset synchronizer circuit and the third logic gate for receiving the third reset synchronizer signal and the third intermediate enable signal, respectively, and generating a sixth synchronizer signal;

a third positive edge detector for receiving the third clock signal, and connected to the third reset synchronizer circuit and the fifth synchronizer for receiving the third reset synchronizer signal and the fifth synchronizer signal, respectively, and generating a fifth detector output signal;

a third negative edge detector for receiving the third clock signal, and connected to the third reset synchronizer circuit and the sixth synchronizer for receiving the third reset synchronizer signal and the sixth synchronizer signal, respectively, and generating a sixth detector output signal; and a fourth combinational logic circuit connected to the fifth and sixth synchronizers for receiving the fifth and sixth synchronizer signals, respectively, connected to the third positive edge detector and the third negative edge detector for receiving the fifth and sixth detector output signals, respectively, and connected to the third output terminal of the decoder for receiving the third select signal, and generating the second enable signal based on the fifth and sixth synchronizer signals, generating the third start timer signal based on the third select signal and the fifth detector output signal, and generating the third stop timer signal based on the third select signal and the sixth detector output signal.

14. The clock multiplexer of claim 10, wherein:

the decoder generates the first select signal at logic high state when the first and second bit signals are at logic low state, the decoder generates the second select signal at logic high state when the first and second bit signals are at logic low and logic high states, respectively, and the decoder generates the third select signal at logic high state when the first and second bit signals are at logic high and logic low states, respectively.

15. The clock multiplexer of claim 14, wherein:

the first combinational logic circuit outputs the first clock signal as the clock output signal when the first select signal is at logic high state, the second clock signal as the clock output signal when the second select signal is at logic high state, and the third clock signal as the clock output signal when the third select signal is at logic high state.

16. The clock multiplexer of claim 14, wherein:

the timeout control circuit generates the timer reset signal when the first bit signal is at logic low state, a logic state of the second bit signal changes from low to high, and the first clock signal is absent, thereby resetting the first and third switchover control circuits, and the timeout control circuit generates the timer reset signal when a logic state of the first bit signal changes from low to high, the second bit signal is at logic low state, and the first clock signal is absent, thereby resetting the first and second switchover control circuits.

17. The clock multiplexer of claim 14, wherein:

the timeout control circuit generates the timer reset signal when the first bit signal is at logic low state, the second bit signal changes from logic high to logic low, and the second clock signal is absent, thereby resetting the second and third switchover control circuits, and the timeout control circuit generates the timer reset signal when the first bit signal changes from logic low to logic high, the second bit signal changes from logic high to logic low, and the second clock signal is absent, thereby resetting the first and second switchover control circuits.

18. The clock multiplexer of claim 14, wherein:
the timeout control circuit generates the timer reset signal when the first bit signal changes from logic high to logic low, the second bit signal is at logic low, and the third clock signal is absent, thereby resetting the second and third switchover control circuits, and the timeout control circuit generates the timer reset signal when the first bit signal changes from logic high to logic low, the second bit signal changes from logic low to logic high, and the third clock signal is absent, thereby resetting the first and third switchover control circuits.

19. The clock multiplexer of claim 10, wherein the first combinational logic circuit comprises:
a first logic gate having a first input terminal that receives the first clock signal, a second input terminal connected to the first switchover control circuit for receiving the third enable signal, and an output terminal for providing a first intermediate signal;

a second logic gate having a first input terminal that receives the second clock signal, a second input terminal connected to the second switchover control circuit for receiving the first enable signal, and an output terminal for providing a second intermediate signal;

a third logic gate having a first input terminal that receives the third clock signal, a second input terminal connected to the third switchover control circuit for receiving the second enable signal, and an output terminal for providing a third intermediate signal; and a fourth logic gate having a first input terminal connected to the output terminal of the first logic gate for receiving the first intermediate signal, a second input terminal connected to the output terminal of the second logic gate for receiving the second intermediate signal, a third input terminal connected to the output terminal of the third logic gate for receiving the third intermediate signal, and an output terminal for providing the clock output signal.

20. The clock multiplexer of claim 10, wherein the timeout control circuit comprises:

a third multiplexer having first, second, and third input terminals for receiving the first, second, and third clock signals, respectively, a two-bit select terminal for receiving the first and second bit signals, and an output terminal for outputting an intermediate clock signal;

an enable control circuit for receiving a comparison signal, and connected to the first, second, and third multiplexers for receiving the start timer output signal, the stop timer output signal, and the intermediate clock signal, respectively, and generating a counter enable signal based on the start timer output signal and generating a counter reset signal based on at least one of the start timer output signal, the comparison signal, and the stop timer output signal;

a counter connected to the third multiplexer for receiving the intermediate clock signal and connected to the enable control circuit for receiving the counter enable signal and the counter reset signal, wherein the counter performs the counting operation for generating the count value based on the counter enable signal and terminates the counting operation based on at least one of the counter enable signal and the counter reset signal;

a comparator connected to the counter for receiving the count value, comparing the count value with the predetermined timer value, and generating the comparison signal; and a NOT gate having an input terminal connected to the comparator for receiving the comparison signal and an output terminal for providing the timer reset signal, wherein the timer reset signal resets at least one of the first, second, and third switchover control circuits when the count value is equal to the predetermined timer value, and wherein the comparison signal comprises the inverted timer reset signal, and wherein the counter is reset by the counter reset signal.

\* \* \* \* \*